United States Patent
Gupta et al.

(10) Patent No.: US 10,158,904 B2
(45) Date of Patent: Dec. 18, 2018

(54) SYSTEMS AND METHODS TO COMBINE PROGRAMMING FROM MULTIPLE CHANNELS

(71) Applicant: Rovi Guides, Inc., Santa Clara, CA (US)

(72) Inventors: Vikram Makam Gupta, Bangalore (IN); Vishwas Sharadanagar Panchaksharaiah, Tumkur District (IN)

(73) Assignee: Rovi Guides, Inc., San Jose, CA (US)

(*) Notice: Subject to any disclaimer, the term of this patent is extended or adjusted under 35 U.S.C. 154(b) by 41 days.

(21) Appl. No.: 14/862,803

(22) Filed: Sep. 23, 2015

(65) Prior Publication Data

US 2017/0085939 A1    Mar. 23, 2017

(51) Int. Cl.
| | |
|---|---|
| *H04N 5/45* | (2011.01) |
| *H04N 5/50* | (2006.01) |
| *H04N 21/45* | (2011.01) |
| *H04N 5/445* | (2011.01) |
| *H04N 21/426* | (2011.01) |
| *H04N 21/431* | (2011.01) |
| *H04N 21/845* | (2011.01) |
| *H04N 21/6543* | (2011.01) |

(52) U.S. Cl.
CPC ..... *H04N 21/4263* (2013.01); *H04N 5/44591* (2013.01); *H04N 5/45* (2013.01); *H04N 5/50* (2013.01); *H04N 21/4314* (2013.01); *H04N 21/4316* (2013.01); *H04N 21/4532* (2013.01); *H04N 21/6543* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 5,453,796 A * | 9/1995 | Duffield | H04N 5/45 348/565 |
| 5,481,296 A | 1/1996 | Cragun et al. | |
| 5,682,207 A | 10/1997 | Takeda et al. | |
| 6,239,794 B1 | 5/2001 | Yuen et al. | |

(Continued)

FOREIGN PATENT DOCUMENTS

| | | |
|---|---|---|
| EP | 0377334 A2 | 7/1990 |
| EP | 0952732 A2 | 10/1999 |
| KR | 20070039766 A | 4/2007 |

OTHER PUBLICATIONS

Wen-Nung Lie et al., Combining Caption and Visual Features for Semantic Event Classification of Baseball Video: IEEE International Conference on Multimedia and Exp, 2005.

*Primary Examiner* — Jonathan V Lewis
(74) *Attorney, Agent, or Firm* — Haley Guiliano LLP

(57) ABSTRACT

Methods and systems for a media guidance application that may enhance viewer experience. The media guidance application may tune to a first program with a first tuner and generate for display the first program on a display area of a display device, determine other programs of interest being broadcast, and simultaneously with the generating for display of the first program, use the second tuner to tune to and generate for display the other programs of interest being broadcast. The second tuner cycles between the additional programs of interest to periodically update the segments of the additional programs of interest generated for display.

20 Claims, 9 Drawing Sheets

(56) References Cited

U.S. PATENT DOCUMENTS

| | | |
|---|---|---|
| 6,304,271 B1 | 10/2001 | Nehme |
| 6,388,714 B1 | 5/2002 | Schein et al. |
| 6,564,378 B1 | 5/2003 | Satterfield et al. |
| 6,665,017 B1 | 12/2003 | Raiyat |
| 6,732,371 B1 * | 5/2004 | Lee .................... H04N 5/44543 348/563 |
| 6,756,997 B1 | 6/2004 | Ward, III et al. |
| 6,882,793 B1 | 4/2005 | Fu et al. |
| 7,165,098 B1 | 1/2007 | Boyer et al. |
| 7,757,252 B1 * | 7/2010 | Agasse ............... H04N 5/44543 715/700 |
| 7,761,892 B2 | 7/2010 | Ellis et al. |
| 8,046,801 B2 | 10/2011 | Ellis et al. |
| 8,484,678 B2 * | 7/2013 | Lee .................... H04N 5/44591 348/563 |
| 8,621,393 B2 | 12/2013 | Chaudhri et al. |
| 8,813,133 B1 * | 8/2014 | DePrez ................ G06F 3/0481 725/61 |
| 8,848,237 B2 | 9/2014 | Tsai |
| 8,925,030 B2 | 12/2014 | Farkash et al. |
| 9,008,190 B2 | 4/2015 | Lee et al. |
| 9,077,847 B2 | 7/2015 | Nam |
| 9,247,283 B1 * | 1/2016 | Wang ................. H04N 21/4314 |
| 9,258,541 B2 | 2/2016 | Choe et al. |
| 9,392,249 B2 | 7/2016 | Choe et al. |
| 9,762,953 B2 * | 9/2017 | Lee .......................... H04N 5/50 |
| 2002/0057372 A1 | 5/2002 | Cavallerano et al. |
| 2002/0140860 A1 | 10/2002 | Ozaki et al. |
| 2002/0174430 A1 | 11/2002 | Ellis et al. |
| 2003/0072372 A1 * | 4/2003 | Shen .................. H04N 21/2187 375/240.16 |
| 2003/0110499 A1 | 6/2003 | Knudson et al. |
| 2003/0121057 A1 | 6/2003 | Signh |
| 2003/0208755 A1 | 11/2003 | Zimmerman |
| 2004/0168121 A1 * | 8/2004 | Matz ................ G06F 17/30867 715/255 |
| 2004/0181813 A1 * | 9/2004 | Ota ...................... H04N 5/4401 725/131 |
| 2005/0251827 A1 | 11/2005 | Ellis et al. |
| 2006/0031894 A1 * | 2/2006 | Petruzzelli ............ H04H 40/90 725/100 |
| 2006/0200842 A1 * | 9/2006 | Chapman ............... H04N 7/163 725/34 |
| 2006/0267995 A1 * | 11/2006 | Radloff ................ G11B 27/105 345/530 |
| 2007/0011702 A1 * | 1/2007 | Vaysman ........... H04N 5/44543 725/45 |
| 2007/0250896 A1 * | 10/2007 | Parker ...................... H04N 5/45 725/135 |
| 2008/0066103 A1 * | 3/2008 | Ellis ................... H04N 5/44591 725/38 |
| 2009/0322962 A1 * | 12/2009 | Weeks ............... H04N 7/17318 348/726 |
| 2010/0031286 A1 * | 2/2010 | Gupta ................ H04N 5/44543 725/38 |
| 2010/0073565 A1 | 3/2010 | Hwang et al. |
| 2010/0115554 A1 * | 5/2010 | Drouet ............... H04N 5/44543 725/41 |
| 2010/0153885 A1 | 6/2010 | Yates |
| 2010/0157156 A1 * | 6/2010 | Yuen .................. H04N 5/44543 348/567 |
| 2010/0313222 A1 * | 12/2010 | Lee .................... H04N 5/44513 725/50 |
| 2011/0078726 A1 * | 3/2011 | Rosenberg ............. G06Q 30/02 725/34 |
| 2011/0164861 A1 * | 7/2011 | Kunkel .................... H04N 5/76 386/343 |
| 2011/0307914 A1 * | 12/2011 | Blight ...................... H04N 5/76 725/14 |
| 2013/0174187 A1 * | 7/2013 | Tan .................. H04N 21/25841 725/10 |
| 2013/0232522 A1 * | 9/2013 | Anthru ............. H04N 21/25891 725/20 |
| 2013/0257749 A1 | 10/2013 | Woods et al. |
| 2014/0101682 A1 | 4/2014 | Schlager et al. |
| 2014/0109144 A1 * | 4/2014 | Asnis ................ H04N 21/43615 725/48 |
| 2015/0181301 A1 | 6/2015 | Bloch et al. |
| 2016/0100121 A1 * | 4/2016 | Shintani .................... H04N 5/45 348/565 |
| 2016/0198214 A1 * | 7/2016 | Levy .................. H04N 21/4316 725/43 |
| 2017/0017645 A1 * | 1/2017 | Neumeier ........... G06F 17/3002 |

* cited by examiner

600

600 ...

601 Initialization Subroutine

602 ...

603 //Routine to Determine Whether a Segment of an Additional Program Needs to be Updated:

604

605   Receive Instances of Refresh Period

606   For Each Instance of Refresh Period:

607     A = Accessed Value of the Instance of Refresh Period:

608     B = Accessed Value of Stored Period Since the Segment of the Additional Program was Update 609     If(Abs(A-B)<=Tolerance)

610       Execute Subroutine to Determine Default Update Settings Using Control Circuitry 611     Else If(A<B)

612       Execute Subroutine to Keep Checking the Period Since the Segment of the Additional Program was Update Using Control Circuitry 613     Else 614       Execute Subroutine to Update the Segment of the Additional Program Using Control Circuitry 615   Execute Subroutine to Search for New Segments of Additional Program to Update Using Control Circuitry

616 ...

617 Termination Subroutine

```
800
800 ···
801 Initialization Subroutine
802 ···
803 //Routine to Search a Database for Events of Interest Based
    on User-specified Characteristics.
804
805   Receive Instances of User-specified Event Characteristics
806   For Each Instance of a User-specified Event Characteristic:
807      Query Database Containing Possible Values of Event
         Characteristics for Entries Matching the User-specified
         Event Characteristic
808         If(Number of Matching Entries > 0)
809            Retrieve Value of the Event Characteristic from
               Database Entries Matching the User-specified
               Event Characteristic
810            Execute Subroutine to Notify the User of an Event
               Having been Detected Using Control Circuitry
811         Else If(Number of Similar Entries > 0)
812            Execute Subroutine to Notify the User of an Event
               that May be of Interest Having been Detected
               Using Control Circuitry
813         Else
814            Execute Subroutine to Continue Monitoring the
               Program of Interest Using Control Circuitry
815   Execute Subroutine to Search for Additional Program of
      Interest using Control Circuitry
816 ···
817 Termination Subroutine
818 ···
```

FIG. 8

SYSTEMS AND METHODS TO COMBINE PROGRAMMING FROM MULTIPLE CHANNELS

BACKGROUND

With the multiplication of channels and program offerings, at any given time multiple television programs may be broadcasted simultaneously, and viewers may rely on picture-in-picture display configurations to watch multiple programs simultaneously. However, in conventional picture-in-picture systems, users are limited in their ability to control the amount and type of information provided by the picture-in-picture displays. Users are forced to either watch a single program without any picture-in-picture displays, or to watch multiple programs within multiple picture-in-picture displays, which can be difficult and/or distracting. Conventional picture-in-pictures systems also require one tuner for each picture-in-picture display. When a user does want to watch multiple programs in picture-in-picture windows, the system is limited by the amount of tuners available.

SUMMARY

Accordingly, methods and systems are disclosed herein for a media guidance application that solves the aforementioned problems and enhances the viewing experience for a user by providing the user with more flexibility to select subsets of program information for display in picture-in-picture windows, and updating the subset of program information for all picture-in-picture windows with only one tuner. Advantageously, the methods and systems disclosed herein allow a user to focus on the program displayed in a main portion of the screen, but also allow the user to view key elements of the other programs, as summarized in the picture-in-picture displays. The methods and systems determine programs of interest to a user and allow display of segments of the programs of interest in picture-in-picture displays. Also advantageously, by using only one tuner to cycle between the different channels and perform the updates to the program information generated for display in the picture-in-picture windows, the number of different programs that can be simultaneously displayed in different picture-in-picture windows is not limited by the number of tuners available to a user. The methods and systems determine additional programs for display on different channels and uses one tuner to tune to each different channel in turn.

In some aspects, the media guidance application may enhance viewer experience by generating for display programs of interest to a user in picture-to-picture windows, and updating them with a single tuner. To do so, the media guidance application tunes to a first program with a first tuner. For example, the media guidance application tunes to "90210" on the CW Network. The media guidance application then generates for display the first program on a display area of the display device. For example, the media guidance application generates for display "90210" on a user's television screen. In this example, because "90210" is the only program generated for display, "90210" can be generated for display in full screen mode, i.e., over the entirety of the user's television screen or display screen.

The media guidance application next determines a second program of interest to a user and a third program of interest to the user, where the second program and the third programs are being broadcasted. For example, the media guidance application determines that the user is interested in California-based TV series and action movies. In this example, the media guidance application determines that "The OC" is being broadcast on channel 90, and that "Bourne Legacy" is being broadcast on channel 100. In this example, "The OC" and "Bourne Legacy" are additional programs of interest that are being broadcast at the same time as the program currently being displayed on the main area of the display device "90210." In this example, the user may want to watch portions of "The OC" when "90210" is boring, and/or may want to wait for a specific scene in "Bourne Legacy" before switching channels.

The media guidance application tunes with a second tuner to the second program, and simultaneously with the generating for display of the first program, generates for display the second program in a first portion of the display area on the display device. For example, the media guidance application tunes to "The OC" with a second tuner, and generates for display a picture-in-picture window with a segment of "The OC." The picture-in-picture window may be an overlay or an opaque window that is displayed concurrently or simultaneously with "90210," which is still generated for display in full screen mode.

The media guidance application tunes with a second tuner to the third program, and simultaneously with the generating for display of the first program and the second program, generates for display the third program, in a second portion of the display area on the display device. For example, the media guidance application tunes to "Bourne Legacy" with the second tuner, and generates for display a picture-in-picture window with a segment of "Bourne Legacy." The picture-in-picture window is displayed concurrently or simultaneously with "90210" and "The OC."

The media guidance application controls the second tuner. The second tuner cycles between the second program and the third program to periodically update the segments of the second program in the first portion of the display area and the segment of the third program in the second portion of the display area. For example, the second tuner tunes to channel 90, acquires a frame from "The OC" and generates that frame or segment for display in a picture-in-picture window. The second tuner then tunes to channel 100, acquires a frame from "Bourne Legacy" and generates that frame or segment for display in another picture-in-picture window. The second tuner then continues to cycle between channels 90 and 100 to periodically update frames or segments for the programs of interest to the user ("The OC" and "Bourne Legacy").

In some embodiments, to generate for display a segment of a program of interest, the media guidance application selects a subset of information from the program, where the subset of information includes at least one of a video segment of the broadcast feed, a geographic portion of an image generated by the broadcast feed, and a portion of metadata associated with the broadcast feed. For example, an additional program of interest to the user may be a baseball game, e.g., Red Sox-Yankees. The media guidance application may determine the score as a subset of information from the Red Sox-Yankees game being broadcast on the MLB network. The media guidance application may for example select the bottom portion of the image generated by the MLB network, which contains the score, as the subset of information. Alternatively, the media guidance application may select the "box" information, which tracks pitch locations as in or out of the box, as the relevant subset of information. Alternatively, the media guidance application may select the closed captioning of the commentary, which is provided as metadata by the MLB network as the relevant subset of information. Once the media guidance application has selected a subset of information, the media guidance application converts the subset into a new format. For example, if the subset of information is the closed-captioned commentary from the metadata, the media guidance application may convert the metadata into an image or text format, and generates a segment of the program from the converted information. For example, the closed-captioned commentary may be used to generate a ticker tape segment. Finally the media guidance application generates for display the segment of the program.

In some embodiments, the media guidance application tunes with a third tuner to a fourth program and, simultaneously with the generating for display of the first, second, and third programs, generates for display a segment of the fourth program in a third portion of the display device, where the second tuner and the third tuner cycle between the second third and fourth programs to periodically update the segments of the second, third and fourth programs. For example, in addition to "90210," "The OC" and "Bourne Legacy," the media guidance application may determine that the Red Sox-Yankees game is being broadcast on the MLB network. Alternatively, the user may indicate that he wants to watch an additional program in an additional picture-in-picture window. The media guidance application may use another tuner to tune to the Red Sox-Yankees game, and update the segment of the game generated for display. In this example, the second tuner and the third tuner are both used to cycle between the second, third and fourth programs—this may be beneficial to increase the frequency of updates. Alternatively, a single tuner may be used to tune to the fourth program and cycle between the second, third and fourth programs.

In some embodiments, the media guidance application generates for display a segment of a program, where the segment of the program includes a plurality of images, and the plurality of images is cropped before the segment of the program is generated for display. For example, the Red Sox-Yankees game may be broadcast to include video of the game, along with score updates for out of town games. In this example, the media guidance application may crop images or frames of the Red Sox-Yankees game to remove the portion of the images that includes the out of town games. This may advantageously declutter the display for the picture-in-picture window.

In some embodiments, the media guidance application crops the segment of the second program of interest before generating it for display, and reformats the segment of the second program to change one of the resolution or file types of the segment of the second program. For example, the media guidance application may determine that a portion of the segment of the Red Sox-Yankees program includes in part commercials. The media guidance application may crop the segment of the program that corresponds to commercials. In addition, the media guidance application may change the resolution of the Red Sox-Yankees game before generating the cropped segment for display in the picture-in-picture window.

In some embodiments, the media guidance application selects a location and dimensions of a portion of the display area on the display device, where the selecting is done by the user. The media guidance application further determines the bounds of the selected portion of the display area based on the location and dimensions, and crops the segment of the program to match the bounds of the selected portions, before generating for display the segment of the program in the selected portion of the display area. For example, a user may indicate that he or she wants the picture-in-picture window for one of the additional programs (e.g., the Red Sox-Yankees game) in the upper right hand of their display screen, and have that picture-in-picture window cover 15% of the overall display. The media guidance application may use the user inputs for overall location and relative size to determine the bounds for the picture-in-picture window, for example, in numbers of pixels, then crop the segment of the Red Sox-Yankees game accordingly (e.g., by cropping ticker tape or advertising portions of the screen). Finally the media guidance application generates for display the Red Sox-Yankees game in a picture-in-picture window in the upper right hand corner.

In some embodiments, the second and third programs of interest to the user are automatically determined based on user preferences. For example, "The OC" and "Bourne Legacy" may be determined as programs of interest based on a user profile indicating that the user likes California-based TV series and action movies. Alternatively, the user may indicate a preference for an actor, a director, a time frame, a genre, a sports team, a player, etc.

In some embodiments, the media guidance application detects that a second program of interest to the user is no longer being broadcasted, and in response to the detecting, automatically stops generating for display a segment of the second program of interest to the user. For example, the media guidance application may detect that the episode of "90210" being broadcasted, and for which a segment is generated for display in a picture-in-picture window, has ended. In this example, the media guidance application may close the picture-in-picture window for the "90210" program. In the example above, the media guidance application would continue to generate for display the picture-in-picture window for "Bourne Legacy."

In some embodiments, the media guidance application receives a user selection of a frequency at which to update the second and third programs of interest. Based on the user selection, the media guidance application determines a frequency at which the second tuner cycles between the second program and the third program, and the media guidance application cycles the second tuner at the determined frequency. For example, a user may choose to update the additional programs of interest every two milliseconds, or every four milliseconds. Alternatively, a user may choose to update a specific program or a specific type of program at a particular frequency. For example, a user may choose to update a picture-in-picture window for a sports program every four minutes, when a user is only tracking the scoring information. In an alternative example, a user may select an update frequency such that no lag is visible to the user, and the programs generated for display in the picture-in-picture windows appear to be seamlessly updated.

In some embodiments, the media guidance application determines that broadcasts for the second program and the third program are about to end, prompts the user to select additional programs of interest, receives a user selection of additional programs of interest, and generates for display the additional programs of interest. For example, the media guidance application may determine that "Bourne Legacy" will end in five minutes. In this example, the media guidance application may prompt the user to watch "Bourne Identity," which is about to be broadcast on channel 119. Alternatively, the media guidance application may provide the user with a guide view to select additional programs of interest. Once an additional program of interest has been selected by the user and received by the media guidance application, the media guidance application can generate the newly selected program of interest in an additional picture-in-picture window, and again instruct the second tuner to cycle through the different programs to update the picture-in-picture windows.

In some aspects, the media guidance application may enhance viewer experience by detecting events of interest to the user in any programs generated for display in picture-in-picture windows, or programs of interest to the user. To do so, the media guidance application tunes to a first program with a first tuner, and generates for display the first program on a display area of a display device. For example, the media guidance application tunes to "The Godfather," which is broadcast on channel 120, and generates for display "The Godfather." In this example, "The Godfather" may be generated for display over the entire display area of the display device, e.g., the television screen or user device screen.

The media guidance application then determines additional programs for display, and generates for display with a second tuner each of the additional programs in a respective portion of the display area on the display device. For example, the media guidance application may determine that the Patriots are playing the Broncos, which is of interest to the user because the user listed the Patriots as one of his favorite teams. Alternatively, the media guidance application may determine that "Jeopardy" is on, which is of interest to the user because the user indicated that he liked game shows. Accordingly, in this example, the media guidance application may generate for display two picture-in-picture windows, which may be transparent or opaque overlays, with one picture-in-picture window for "Jeopardy" and one picture-in-picture window for "Patriots-Broncos."

The media guidance application controls a second tuner, which periodically cycles between each of the additional programs and updates a segment of each additional program that is generated for display in each respective portion of the display area. For example, the media guidance application may instruct the second tuner to tune to "Jeopardy" and generate for display a segment (e.g., a frame or a portion of) "Jeopardy." The media guidance application may then instruct the second tuner to tune to "Patriots-Broncos" and generate for display a segment (e.g., a frame or a portion of) "Patriots-Broncos), before tuning back to "Jeopardy" and updating the segment generated for display.

The media guidance application monitors each of the additional programs for upcoming events of interest to a user, and determines an event of interest to the user in a segment of one of the additional programs generated for display. For example, the media guidance application may determine that a "touchdown" is always an event of interest for a football program. Alternatively, the media guidance application may determine that any scoring by the Patriots is an event of interest, because the user indicated the Patriots as his favorite team. Alternatively, the user may have specified interest in a particular player (e.g., Tom Brady) and accordingly certain actions by Brady may be determined to be events of interest. Alternatively, an event of interest may also be defined as a transition, such as a transition from a live video feed to a commercial or a recorded segment. Alternatively, an event of interest may be recorded as a change in program.

In response to determining an event of interest to the user in a segment of one of the additional programs generated for display, the media guidance application automatically modifies a portion of the display area corresponding to the segment. For example, the media guidance application has been monitoring the "Patriots-Broncos" game and determines that the Patriots have just scored a touchdown. A touchdown is a scoring event, and as such is an event of interest. Accordingly, the media guidance application may display an alert for the user, such as a pop-up notification "Touchdown!" Alternatively, if the Patriots-Broncos game switches to a commercial break, and a change to commercial is an event of interest, the media guidance application may minimize the picture-in-picture window for the Patriots-Broncos game.

The media guidance application controls the second tuner, which is used to generate for display the segments generated for display for each additional program. The second tuner periodically cycles between each of the additional programs at a predetermined frequency and updates at the predetermined frequency the segment of each additional program that is generated for display. For example, the second tuner cycles between the "Patriots-Broncos" game and "Jeopardy" to update the segments generated for display for both programs.

In some embodiments, to determine the event of interest to the user, the media guidance application receives a segment of additional program with the second tuner, where the segment includes metadata. The media guidance application processes the segment data by using at least one of optical character recognition "OCR" and motion recognition on the segment data. The media guidance application compares at least one of the metadata and processed segment data with event characteristics to detect the event. For example, if an event of interest to a user is "Alex Rodriguez at bat," the media guidance application may receive a segment of a Red Sox-Yankees game and detect either in the metadata (e.g., closed captioned commentary) or in the video feed (e.g., in a roster window) via OCR the words "Alex Rodriguez" and "at bat." The media guidance application determines that data from the segment of the Red Sox-Yankees game accordingly matches the event characteristics "Alex Rodriguez at bat."

In some embodiments, the media guidance application receives a user selection of characteristics for the event of interest to the user, where the event characteristics include at least one of a program type, an event type, a time, and an action by a participant in the program. For example, the user may indicate characteristics for events of interest, e.g., through a set-up menu or through a user profile. For example, a user may indicate an action by a participant, such as "Alex Rodriguez at bat" or "Patriots touchdown" in previous examples. Alternatively, a user may indicate characteristics such as an event type, for example, "switch to commercial" or "panel discussion" that the user wishes to avoid. Alternatively, the user may indicate characteristics of an event type that the user wishes to focus on, such as "touchdown" or "medal ceremony."

In some embodiments, the media guidance application generates for display a notification to the user that the event of interest to the user occurred in the segment of one of the additional programs generated for display. For example, a user is watching the luge Olympic time trials in the main portion of the screen, but has the hockey gold medal game in a picture-in-picture window. In this example, if the user indicated "medal ceremony" as an event of interest, the media guidance application may generate a notification to the user "Medal Ceremony Beginning" to provide the user with an opportunity to switch channels if desired, or at least to pay attention to the medal ceremony shown in the picture-in-picture window.

In some embodiments, when the media guidance application automatically modifies a portion of the display area, the media guidance application removes the portion of the display area corresponding to the segment of one of the additional programs in which the event of interest to the user took place. For example, in the Olympic medal ceremony example above, the media guidance application may automatically switch the programs generated for display in the main area of the display screen and in the picture-in-picture window. For example, the medal ceremony for the hockey gold medal game may be automatically generated for display in full-screen after tuning to it via the first tuner, and the luge time trials may be generated for display in the picture-in-picture window previously displaying the medal ceremony, updated on a regular basis by the second tuner.

In some embodiments, the media guidance application determines a second event of interest to the user in an additional program not generated for display. The media guidance application automatically generates for display in a portion of the display area a segment of the additional program in which the second event of interest to the user took place. For example, the user may be watching "Bridget Jones's Diary" in full screen mode, and may have the Olympics generated for display in a picture-in-picture window. However, the user may have forgotten that the Patriots-Broncos game was being broadcast. The media guidance application may detect a touchdown for the Patriots and generate for display a new picture-in-picture window in which the Patriots-Broncos game will be shown.

In some embodiments, the media guidance application receives a user selection of criteria for additional programs and determines programs that meet the received criteria. In response to determining programs that meet the received criteria, the media guidance application alerts the user of the determined programs that meet the received criteria. For example, a user may provide either via a user profile or via set-up menu preferences including but not limited to sports teams, specific athletes, actors, directors, time periods (e.g., the 80 s), genres (e.g., comedies), or keywords (e.g., "#Deflategate"). For example, the media guidance application may determine that a user is interested in George Clooney, and may alert the user to programs that include George Clooney. For example, the media guidance application may generate for display a pop-up notification "Ocean's 11 @ 9 pm—would you like to watch?"

In some embodiments, the media guidance application selects a location and dimensions of a first respective portion of the display area on the display device, where the selecting is done by the user. The media guidance application determines bounds of the first respective portion of the display area based on the location and dimensions. The media guidance application crops the segment of one of the additional programs to match the bounds, and the media guidance application generates for display the segment of the one of the additional programs in the first respective portion of the display area. As described above, for example, a user may prefer to have a picture-in-picture window located in the upper right-hand corner of the main area of the display screen, and the user may also prefer to have the picture-in-picture window occupy 20% of the main area. The media guidance application may determine the exact bounds of the picture-in-picture window (e.g., in pixels) based on the location and the dimensions (e.g., the 20%). The media guidance application may also crop the segment of the program to declutter the display in the picture-in-picture window.

In some embodiments, the media guidance application receives a user selection of a frequency at which to update the segment of each additional program that is generated for display. Based on the user selection, the media guidance application determines the predetermined frequency at which the second tuner cycles between each of the additional programs, and cycles the second tuner at the predetermined frequency. For example, as discussed above, a user may select how often segments of additional programs must be updated. A user may select to update certain programs more often than others, depending on the type of programs, or the level of interest of the user in the program. Alternatively, default settings may exist for different program types, or based on the number of picture-in-picture windows generated for display.

In some embodiments, to generate for display each additional program, the media guidance application crops the segment of each additional program generated for display before generating for display the segment of the additional program. The media guidance application reformats the segment of each additional program generated for display to change one of the resolution or file types of the segment of each additional program. For example, as discussed above, the media guidance application may determine that a portion of the segment of the "Patriots-Broncos" program includes in part commercials. The media guidance application may crop the segment of the program that corresponds to commercials. In addition, the media guidance application may change the resolution of the "Patriots-Broncos" game before generating the cropped segment for display in the picture-in-picture window.

It should be noted that the systems, methods, apparatuses and/or aspects described above may be applied to, or used in accordance with, other systems, methods, apparatuses and/or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is exemplary pseudocode of an algorithm for determining whether a segment of an additional program of interest generated for display in a picture-in-picture window needs to be updated, in accordance with some embodiments of the disclosure;

FIG. 8 is exemplary pseudocode of an algorithm for determining events of interest in a program of interest, using a database containing event characteristics associated with a program of interest and user-specified event characteristics, in accordance with some embodiments of the disclosure;

DETAILED DESCRIPTION OF DRAWINGS

Figure 1:
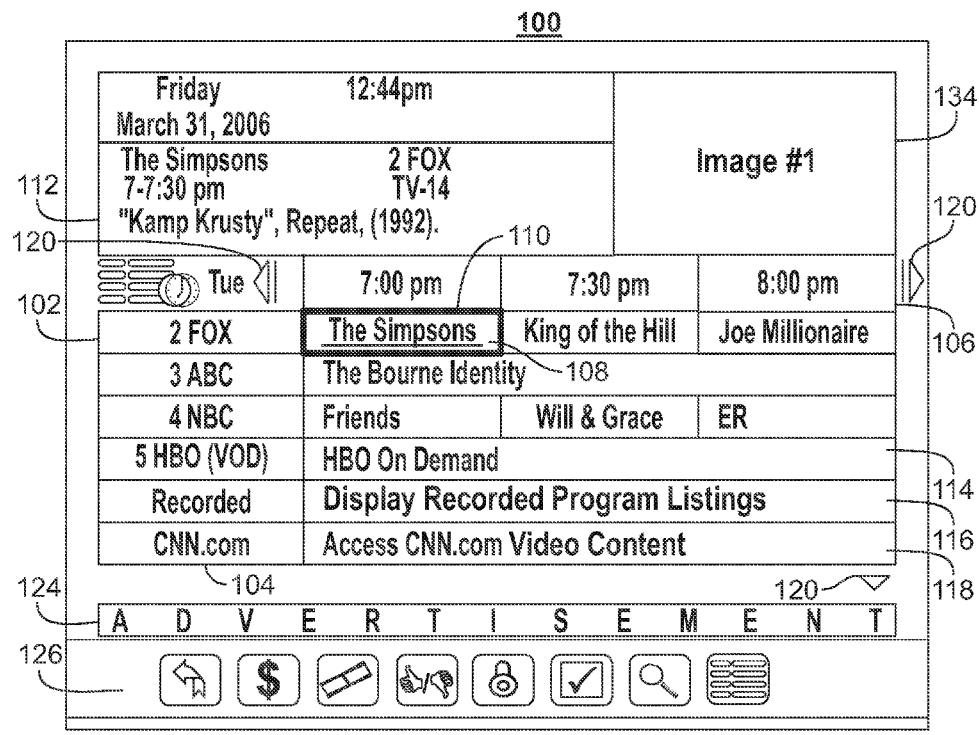
FIG. 1 shows an illustrative media guidance application for enhancing viewer experience in accordance with some embodiments of the disclosure.

Methods and systems are disclosed herein for enhancing the viewing experience for users of a media guidance application. In any given content delivery system the amount of content available to users can be substantial. Consequently, many users desire to watch multiple programs simultaneously by using picture-in-picture windows to watch additional programs. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, a media guidance application may enhance the viewing experience for a user. For example, a media guidance application may allow a user to fully enjoy watching one program, while simultaneously keeping track of selected information for certain additional programs. Advantageously, the media guidance application only uses one tuner to cycle through additional programs selected for display, leaving additional tuners available for recording operations.

As referred to herein, "simultaneously" refers to doing something at substantially the same time as something else. For example, a movie may be generated for display in full screen, and at the same time an additional program may be generated for display in a picture-in-picture window.

As referred to herein, "of interest" refers to any program, event, feature, or combination thereof that a user has flagged, directly or indirectly. For example, if the user indicates the Patriots as one of his favorite teams, then any event involving Tom Brady, the quarterback for the Patriots, is indirectly an event of interest. For example, if a user has indicated a genre "comedy" of interest to him, and if the user has indicated that he likes the work of George Clooney, the mention in a program of "George's Clooney new comedy" may be an event of interest. For example, if a user has indicated that he "liked" or is "following" a team, player or entity on social media anything mentioned by the team, player or entity, for example through posts or tweets may be an event of interest.

As referred to herein, the terms "segment of information" and "subset of information" refer to any portion of a program, whether a time segment of the program (e.g., a clip, measured in number of frames or in seconds and minutes), or a geographic segment of the program (e.g., the upper half of the program generated for display). Alternatively, "segment" may also refer to a component of the program, such as audio data, metadata, video data, or any combination thereof.

As referred to herein, the term "metadata" may refer to textual information associated with a broadcast channel and a program. For example, metadata includes additional information generated for display when a user navigates channel listings in an EPG and selects a particular program. This additional information associated with a program may be curated by experts and is saved in the system before the start of the program. The term "metadata" may also refer to textual information that is displayed within the video of a program as part of the broadcast feed. For example, metadata includes the score or state of the game generated for display and that changes frequently. This type of metadata is part of the video in pixel format and OCR may be used on this type of metadata to extract textual information such as the scores of the games.

As referred to herein, the terms "update frequency" and "refresh rate" may be used interchangeably, and refer to an indicator of a time period between two updates. For example, an update frequency of 1 Hz indicates that two updates of a segment are separated by one second. Alternatively, a refresh rate of one second also indicates that two updates of a segment are separated by one second. Frequencies or time periods may be used interchangeably to define the period of time separating updates.

In a first exemplary embodiment, the media guidance application may enhance viewer experience by generating for display programs of interest to a user in picture-to-picture windows, and updating them with a single tuner.

In this first exemplary embodiment, the media guidance application tunes to a first program with a first tuner and generates for display the first program on a display area of the display device. For example, in response to a user selection of the NHL network channel, the media guidance application tunes to "Rangers-Capitals" on the NHL network, and generates for display the Rangers-Capitals game in full screen.

While the media guidance application is still generating for display the Rangers-Capitals game, the media guidance application determines additional programs of interest to the user, which are also currently being broadcast. For example, the Rangers-Capitals game is broadcast from 7-10 pm EST. In that 7-10 pm EST time window, "Out of Africa" is also being broadcast on channel 82, and "Family Guy" is being broadcast on channel 122. The user may have indicated in a profile or through a set-up screen that he likes classic movies, and/or movies with Robert Redford. Accordingly, "Out of Africa" is both a program of interest and a program that is currently being broadcast. Similarly, the user may have indicated that he likes "shows similar to American Dan," and "Family Guy" is therefore also both a program of interest to the user and a program being broadcast.

While still generating for display the "Rangers-Capitals" game, the media guidance application tunes with a second tuner to "Out of Africa" and generates for display a picture-in-picture window with a segment of "Out of Africa." Similarly, while still generating for display the "Rangers-Capitals" game and still generating for display the "Out of Africa" picture-in-picture window, the media guidance application tunes to "Family Guy" and generates for display another picture-in-picture window with a segment of "Family Guy."

The media guidance application controls the second tuner. In this example, the second tuner cycles between the channels for "Out of Africa" (82) and "Family Guy" (122) to periodically update the segments of the programs shown in their respective picture-in-picture windows. For example, the second tuner can cycle between channels 82 and 122 at a frequency ranging from 1 Hz to 600 Hz. A smaller frequency, e.g., 1 Hz, means updates to the programs accessed with the second tuner will be less frequent. Alternatively, a higher frequency, e.g., 60 Hz, means the user will not be able to tell from the picture-in-picture windows generated for display that the images generated for display are only a segment of the programs being broadcast, rather than the continuous stream actually being broadcast. A user with a set-top box having a limited number of tuners will benefit from being able to watch additional programs simultaneously in picture-in-picture windows while only using one tuner, leaving the other tuners free for other tasks, e.g., for recording.

In some embodiments, to generate for display a segment of a program of interest, the media guidance application selects a subset of information from the program, where the subset of information includes at least one of a video segment of the broadcast feed, a geographic portion of an image generated by the broadcast feed, and a portion of metadata associated with the broadcast feed. For example, an additional program of interest to the user may be a baseball game, e.g., "Rangers-Capitals." The media guidance application may determine the scoring as a subset of information from the "Rangers-Capitals" game being broadcast on the NHL network. The media guidance application may for example select the bottom portion of the image generated by the NHL network, which contains the score, as the subset of information. Alternatively, the media guidance application may select the main video feed as the relevant subset of information. Alternatively, the media guidance application may select an alternative video feed, such as the footage from the goalie cam, made available by the NHL network. Alternatively, the media guidance application may select the closed captioning of the commentary for the game, which is provided as metadata by the MLB network as the relevant subset of information. Once the media guidance application has selected a subset of information, the media guidance application may convert the subset of information into a new format. For example, if the subset of information is the goalie-cam footage, the media guidance application may resize the goalie-cam video feed to include in the picture-in-picture window both the goalie-cam video feed, and a bottom strip with the text corresponding to the game commentary. Finally the media guidance application generates for display the segment of the program. In the example above the segment of the program could be a combination of the goalie-cam footage along with a transcript of the commentary.

In some embodiments, the media guidance application tunes with a third tuner to a fourth program, and simultaneously with the generating for display of the first, second and third programs, generates for display a segment of the fourth program in a third portion of the display device, where the second tuner and the third tuner cycle between the second, third and fourth programs to periodically update the segments of the second, third and fourth programs. For example, in addition to "Rangers-Capitals," "Out of Africa" and "Family Guy," the media guidance application may determine that the "Red Sox-Yankees" game is being broadcast on the MLB network. Alternatively, the user may indicate that he wants to watch an additional program in an additional picture-in-picture window. In an exemplary embodiment, the user may continue to select as many additional programs of interest as desired for simultaneous display. In one example, the second tuner alone may continue to be used to tune to and update each program of interest in turn. Alternatively, in another example, two tuners may be used to tune to and update each program of interest. The user of two tuners may allow for more frequent updates, especially when a user is watching a large number of additional programs of interest. In an example, both tuners may cycle through programs at the same frequency. In another example, one of the tuners may cycle through the programs at a first frequency, and the other of the tuners may cycle through the programs at a second, different, frequency. For example, a user watching football on Sunday afternoons may want to watch all six games happening at the same time. In one example, one tuner may be used to generate for display a first game (e.g., Patriots-Colts). Then, one or two additional tuners may be used to tune to the five remaining games and update the segments of the games generated for display in five respective picture-in-picture windows. In some examples, the picture-in-picture windows may be identical in size and resolution. In another example, each picture-in-picture window may have a different size and the segment generated for display may have a different resolution.

In some embodiments, the media guidance application generates for display a segment of a program, where the segment of the program includes a plurality of images, and the plurality of images is cropped before the segment of the program is generated for display. For example, "Out of Africa" may be broadcast in an original format that includes black strips at the top and bottom of the image. In this example, the media guidance application may crop the black strips from the "Out of Africa" broadcast to provide the user with an "Out of Africa" image that completely fills the picture-in-picture window.

In some embodiments, the media guidance application crops the segment of the second program of interest before generating it for display, and reformats the segment of the second program to change one of the resolution or file types of the segment of the second program. For example, the media guidance application may determine that a portion of a "Patriots-Broncos" game generated for display in a picture-in-picture window includes a segment that corresponds to the half-time report. The media guidance application may crop the segment of the program that corresponds to the half-time report. For example, the user would see the last frame before the half-time report, and then the user would see the first frame after the half-time report. Alternatively, the media guidance application may crop a geographical segment of the video feed for the second program. For example, the media guidance application may crop portions of the video feed where no motion is detected, effectively "zooming in" on the action. For example, for the "Patriots-Broncos" game, the media guidance application may crop the video feed to avoid having a portion of the image be taken up by a view of the seats in the stadium. In another example, the media guidance application may change the resolution of a segment of a program before generating for display the segment of the program in a picture-in-picture window.

In some embodiments, the media guidance application selects a location and dimensions of a portion of the display area on the display device, where the selecting is done by the user. The media guidance application further determines the bounds of the selected portion of the display area based on the location and dimensions, and crops the segment of the program to match the bounds of the selected portions, before generating for display the segment of the program in the selected portion of the display area. For example, a user may indicate that he or she wants the picture-in-picture window for sports programs to be located in a column configuration on the right-hand side of the display device screen. In another example, a user may indicate that he or she wants any movies to be located in a row configuration on the bottom of the screen.

In another example, the media guidance application may upload to server the bounds of the selected portions. The media guidance application may also download from a server bounds of previously selected portions. These previously selected portions may have been selected by users through the media guidance application, o may have been defined by experts or curators. The media guidance application may generate for display bounds previously selected by users or by curators by using a marching ants demarcation technique. For example, Joe selects an area of the screen corresponding to the wheel to generate for display a picture-in-picture window with a segment of "Wheel of fortune." In this example, when Sherry is deciding which segment of "Wheel of fortune" to generate for display in a picture-in-picture window, Sherry can generate for display bounds pre-set by other users for this program, including the bounds set by Joe. In this example Sherry can then easily select the bounds set by Joe, without having to manually define the bounds for her segment of "Wheel of Fortune." In an alternative examples, official from the MLB network pre-define bounds corresponding to the scoring area for MLB games being broadcast. Subsequently, when Joe is deciding which segment of an MLB game to generate for display in a picture-in-picture window, Joe can generate for display pre-set bounds, and select the MLB pre-defined score bounds for MLB games.

Alternatively, a user may indicate that she wants the score for three different ongoing games to be displayed as three horizontal ticker tape bands at the bottom of the screen. The media guidance application may acquire location information by prompting the user each time a new picture-in-picture window is generated. Alternatively, the media guidance application may rely on established user settings, based on a user profile or a set-up performed by the user. Alternatively, the media guidance application may apply default settings. User inputs for the location and size of each picture-in-picture window may take various forms.

For example, the media guidance application may generate a cursor for the user to position where the picture-in-picture window should be located. Alternatively, the media guidance application may generate for display a grid, and a user may select one "tile" within the grid to position the picture-in-picture window. Alternatively, a user may input a ratio of the size of the picture-in-picture window to the size of the display screen, e.g., a percentage. Alternatively, a user may select from a menu one dimension such as a length or height, and the media guidance application may automatically determine the corresponding other dimension. Alternatively, a user may select an option that requests the media guidance application to determine an optimal location for the picture-in-picture window. For example, the optimal location for the picture-in-picture window may be dependent on the program generated for display in the main area or "full-screen" area of the display device. For example, if "Out of Africa" is generated for display in full screen, with black strips located at the top and the bottom of the screen, the optimal location for the score for the "Rangers-Capitals" game may be a ticker-tape format located over the bottom black strip of the "Out of Africa" program. In some examples, picture-in-picture windows may be opaque, such as in the above ticker-tape format for the "Out of Africa" program. Alternatively, the picture-in-picture windows may be semi-opaque or have varying degrees of transparency.

In some embodiments, the second and third programs of interest to the user are automatically determined based on user preferences. For example, a user profile may indicate "Roger Federer" and "Lewis Hamilton" as some of the favorite athletes for the user. In another example, the user profile may indicate which programs the user prefers to watch in picture-in-picture windows, or which programs the user prefers to watch in full-screen mode. In another example, the user may indicate preferences with priorities. For example, a user may prioritize comedies with Will Ferrell higher than war movies. Alternatively, the user may also indicate time preference priorities. For example, after 8 pm during weekdays the user may prioritize news programs over any other programs. Alternatively, during the hockey playoff season, the user may prioritize hockey games over any other programs.

In some embodiments, the media guidance application detects that a second program of interest to the user is no longer being broadcasted, and in response to the detecting, automatically stops generating for display a segment of the second program of interest to the user. For example, the media guidance application may detect that "Out of Africa," generated for display in one of the picture-in-picture windows, has ended. In this example, the media guidance application may close the picture-in-picture window for the "Out of Africa" program. In one example, the media guidance application may generate for display an option for the user to replace "Out of Africa" with another program. Alternatively, the media guidance application may generate for display a confirmation message before closing the picture-in-picture window in which "Out of Africa" was previously generated for display. In one example, if no confirmation is received within a certain amount of time (e.g., five seconds) the media guidance application may automatically close the picture-in-picture window.

In some embodiments, the media guidance application receives a user selection of a frequency at which to update the second and third programs of interest. Based on the user selection, the media guidance application determines a frequency at which the second tuner cycles between the second program and the third program, and the media guidance application cycles the second tuner at the determined frequency. For example, a user may choose to update the additional programs of interest "often" or "very often" or "as frequently as possible." In one example, a user may select an option for updating the additional programs of interest. The option may be one of the qualitative options listed above, or similar qualitative alternatives. Alternatively a user may select a frequency range. Alternatively a user may choose update settings which may vary for different programs, or instead may be specific to a particular program. For example a user may choose to generally update a picture-in-picture window as little as possible, unless the picture-in-picture window corresponds to a sports program in which case the user wishes to update the segment for the sports programs "as often as possible". In an alternative example, a user may select an update frequency such that no lag is visible to the user, and the programs generated for display in the picture-in-picture windows appear to be seamlessly updated. The media guidance application may then convert the qualitative setting selected by the user into a quantitative setting, guided by the system capabilities. For example, if a user selected the option to refresh "as often as possible," and the media guidance application determines that the system the user has can at most tune to program at a frequency of 120 Hz, the media guidance application will use the 120 Hz frequency.

In some embodiments, the media guidance application determines that broadcasts for the second program and the third program are about to end, prompts the user to select additional programs of interest, receives a user selection of additional programs of interest, and generates for display the additional programs of interest. For example, the media guidance application may determine that "Family Guy" will end in five minutes. In this example, the media guidance application may notify the user that "Family Guy" will end in five minutes. In one example, the notification may also include a message indicating alternative programs of interest that are currently being broadcast. For example, the notification may state "Family Guy is about to end—when it does, would you like to watch American Dad?" Alternatively, the media guidance application may provide the user with a menu or a selection of additional programs of interest for the user to pick from. Once an additional program of interest has been selected by the user and received by the media guidance application, the media guidance application can generate the newly selected program of interest in an additional picture-in-picture window, and again instruct the second tuner to cycle through the different programs to update the picture-in-picture windows.

In a second exemplary embodiment, the media guidance application may enhance viewer experience by detecting events of interest to the user in any programs generated for display in picture-in-picture windows, or programs of interest to the user.

In this second exemplary embodiment, the media guidance application tunes to a first program with a first tuner, and generates for display the first program on a display area of a display device. For example, the media guidance application tunes to "Cowboys and Aliens," which is broadcast on channel 220, and generates for display "Cowboys and Aliens." In this example, "Cowboys and Aliens" may be generated for display over the entire display area of the display device, e.g., the television screen or user device screen.

The media guidance application then determines additional programs for display, and generates for display with a second tuner each of the additional programs in a respective portion of the display area on the display device. For example, the media guidance application may determine that "Hell's kitchen" is on, which is of interest to the user because the user listed Gordon Ramsey as one of his favorite celebrities. Alternatively, the media guidance application may determine that "The Real Housewives of the OC" is on, which is of interest to the user, because the user indicated that he liked reality TV shows. Accordingly, in this example, the media guidance application may generate for display two picture-in-picture windows, which may be transparent or opaque overlays, with one picture-in-picture window for "Hell's Kitchen" and one picture-in-picture window for "The Real Housewives of the OC."

The media guidance application controls a second tuner, which periodically cycles between each of the additional programs and updates a segment of each additional program that is generated for display in each respective portion of the display area. For example, the media guidance application may instruct the second tuner to tune to "The Real Housewives of the OC" and generate for display a segment (e.g., a frame or a portion) of "The Real Housewives of the OC." The media guidance application may then instruct the second tuner to tune to "Hell's Kitchen" and generate for display a segment (e.g. a frame or a portion) of "Hell's Kitchen"), before tuning back to "The Real Housewives of the OC" and updating the segment generated for display.

The media guidance application monitors each of the additional programs for upcoming events of interest to a user, and determines an event of interest to the user in a segment of one of the additional programs generated for display. For example, the media guidance application may determine that a profanity from Gordon Ramsey is an event of interest for the user because it makes him laugh. Alternatively, the media guidance application may determine that the appearance of a particular housewife on "The Real Housewives of the OC" is an event of interest, because the user indicated that housewife as his favorite character on the show. Alternatively, the user may have specified interest in a particular point in the program, e.g., the mid-point. For example, the user may indicate the 50% and 75% points of a program as events of interest. Alternatively, an event of interest may also be a transition, such as a transition from a live video feed to a commercial or a recorded segment. For example, a user may indicate transitions from commercials to non-commercials as an event of interest.

In response to determining an event of interest to the user in a segment of one of the additional programs generated for display, the media guidance application automatically modifies a portion of the display area corresponding to the segment. For example, the media guidance application has been monitoring the "The Real Housewives of the OC" program and determines that the camera is currently following Sheila. The user has indicated Sheila as one of his favorite characters on the show. Accordingly, the appearance of Sheila is an event of interest to the user. The media guidance application may detect the appearance of Sheila either through the use of metadata in the program "The Real Housewives of the OC" or from applying facial recognition software to the program "The Real Housewives of the OC." Alternatively, the media guidance application may scan the close caption information until the word "Sheila" is detected at a certain frequency, e.g., twice within 60 seconds. In response to detecting that Sheila is currently on the "The Real Housewives of the OC", the media guidance application may display an alert for the user, such as "Sheila." Alternatively, the media guidance application may use metadata to create the alert for the user. For example, if Sheila is complaining about her day, the media guidance application may generate an alert to the user such as "Sheila is having a bad day." Alternatively, instead of, or in combination with, the alert, the media guidance application may generate for display "The Real Housewives of the OC" in a larger picture-in-picture window. For example, the size of the picture-in-picture window may double when an event is detected. Alternatively, the picture-in-picture window may blink, or a frame may be generated for display to highlight the picture-in-picture window in which "The Real Housewives of the OC" is generated for display, to indicate to the user that an event occurred. In some examples, the media guidance application may also generate for display the program in which the event happened in the main area of the display device screen, rather than in the picture-in-picture window. For example, when "Sheila" is detected, "The Real Housewives of the OC" may be generated for display in full screen mode. Alternatively, if a program switched from the actual program to an advertisement, and switching to commercials is an event, the media guidance application may minimize the picture-in-picture window, or close it altogether. Alternatively, the media guidance application may gray out the picture-in-picture window until commercials are over, or generate for display as an overlay over the picture-in-picture window a banner "Commercial break."

The media guidance application controls the second tuner, which is used to generate for display the segments generated for display for each additional program. The second tuner periodically cycles between each of the additional programs at a predetermined frequency and updates at the predetermined frequency the segment of each additional program that is generated for display. For example, the second tuner cycles between the "The Real Housewives of the OC" and "Hell's Kitchen" to update the segments generated for display for both programs.

In some embodiments, to determine the event of interest to the user, the media guidance application receives a segment of additional program with the second tuner, where the segment includes metadata. The media guidance application processes the segment data by using at least one of optical character recognition "OCR" and motion recognition on the segment data. The media guidance application compares at least one of the metadata and processed segment data with event characteristics to detect the event. For example, if an event of interest to a user is "Gordon Ramsey is upset" the media guidance application may receive a segment of "Hell's Kitchen" and detect either in the metadata (e.g., closed captioned commentary) or in the video feed (e.g., by using facial recognition software) that Gordon Ramsey is indeed upset. The media guidance application determines that data from the segment of "Hell's Kitchen" matches the event characteristics "Gordon Ramsey is upset."

In some embodiments, the media guidance application receives a user selection of characteristics for the event of interest to the user, where the event characteristics include at least one of a program type, an event type, a time, and an action by a participant in the program. For example, the user may indicate characteristics for events of interest, e.g., through a set-up menu or through a user profile. For example, a user may indicate an action by a participant, such as "Gordon Ramsey is upset" or "Robert Redford is on screen" in the previously mentioned "Hell's Kitchen" and "Out of Africa" examples. Alternatively, a user may indicate characteristics such as an event type, for example, "switch to commercial" or "panel discussion" that the user wishes to avoid. Alternatively, the user may indicate characteristics of an event type that the user wishes to focus on, such as "touchdown" or "medal ceremony."

In some embodiments, the media guidance application generates for display a notification to the user that the event of interest to the user occurred in the segment of one of the additional programs generated for display. For example, for a user watching the luge Olympic time trials in the main portion of the screen, but having the hockey gold medal game in a picture-in-picture window, if the user indicated "medal ceremony" as an event of interest, the media guidance application may generate a notification to the user "Medal Ceremony Beginning," to provide the user with an opportunity to switch channels if desired, or at least to pay 52817054_1attention to the medal ceremony shown in the picture-in-picture window.

In some embodiments, when the media guidance application automatically modifies a portion of the display area, the media guidance application removes the portion of the display area corresponding to the segment of one of the additional programs in which the event of interest to the user took place. For example, in the Olympic medal ceremony example above, the media guidance application may automatically switch the programs generated for display in the main area of the display screen, and in the picture-in-picture window. For example, the medal ceremony for the hockey gold medal game may be automatically generated for display in full screen after tuning to it via the first tuner, and the luge time trials may be generated for display in the picture-in-picture window previously displaying the medal ceremony, updated on a regular basis by the second tuner.

In some embodiments, the media guidance application determines a second event of interest to the user in an additional program not generated for display. The media guidance application automatically generates for display in a portion of the display area a segment of the additional program in which the second event of interest to the user took place. For example, the user may be watching "Bridget Jones's Diary" in full screen mode, and may have the Olympics generated for display in a picture-in-picture window. However, the user may have forgotten that the "Patriots-Broncos" game was being broadcast. The media guidance application may detect a touchdown for the Patriots and generate for display a new picture-in-picture window in which the Patriots-Broncos game will be shown.

In some embodiments, the media guidance application receives a user selection of criteria for additional programs and determines programs that meet the received criteria. In response to determining programs that meet the received criteria, the media guidance application alerts the user of the determined programs that meet the received criteria. For example, a user may provide either via a user profile or via set-up menu preferences, including but not limited to sports teams, specific athletes, actors, directors, time periods (e.g., the 80 s), genres (e.g., comedies), or keywords (e.g., "Deflategate"). For example, the media guidance application may determine that a user is interested in George Clooney, and may alert the user to programs that include George Clooney. For example, the media guidance application may generate for display a pop-up notification "Ocean's 11 @ 9 pm—would you like to watch?"

In some embodiments, as described above with respect to the first exemplary embodiment, the media guidance application selects a location and dimensions of a first respective portion of the display area on the display device, where the selecting is done by the user. The media guidance application determines bounds of the first respective portion of the display area based on the location and dimensions. The media guidance application crops the segment of one of the additional programs to match the bounds, and the media guidance application generates for display the segment of the one of the additional programs in the first respective portion of the display area. As described above, for example, a user may prefer to have a picture-in-picture window located in the upper right-hand corner of the main area of the display screen, and the user may also prefer to have the picture-in-picture window occupy 20% of the main area. The media guidance application may determine the exact bounds of the picture-in-picture window (e.g., in pixels) based on the location and the dimensions (e.g., the 20%). The media guidance application may also crop the segment of the program to declutter the display in the picture-in-picture window.

In some embodiments, as described above with respect to the first exemplary embodiment, the media guidance application receives a user selection of a frequency at which to update the segment of each additional program that is generated for display. Based on the user selection, the media guidance application determines the predetermined frequency at which the second tuner cycles between each of the additional programs, and cycles the second tuner at the predetermined frequency. For example, as discussed above, a user may select how often segments of additional programs must be updated. A user may select to update certain programs more often than others, depending on the type of programs, or the level of interest of the user in the program. Alternatively, default settings may exist for different program types, or based on the number of picture-in-picture windows generated for display.

In some embodiments, to generate for display each additional program, the media guidance application crops the segment of each additional program generated for display before generating for display the segment of the additional program. The media guidance application reformats the segment of each additional program generated for display to change one of the resolution or file types of the segment of each additional program. For example, as discussed above, the media guidance application may determine that a portion of the segment of the "Patriots-Broncos" program includes in part commercials. The media guidance application may crop the segment of the program that corresponds to commercials. In addition, the media guidance application may change the resolution of the "Patriots-Broncos" game before generating the cropped segment for display in the picture-in-picture window.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
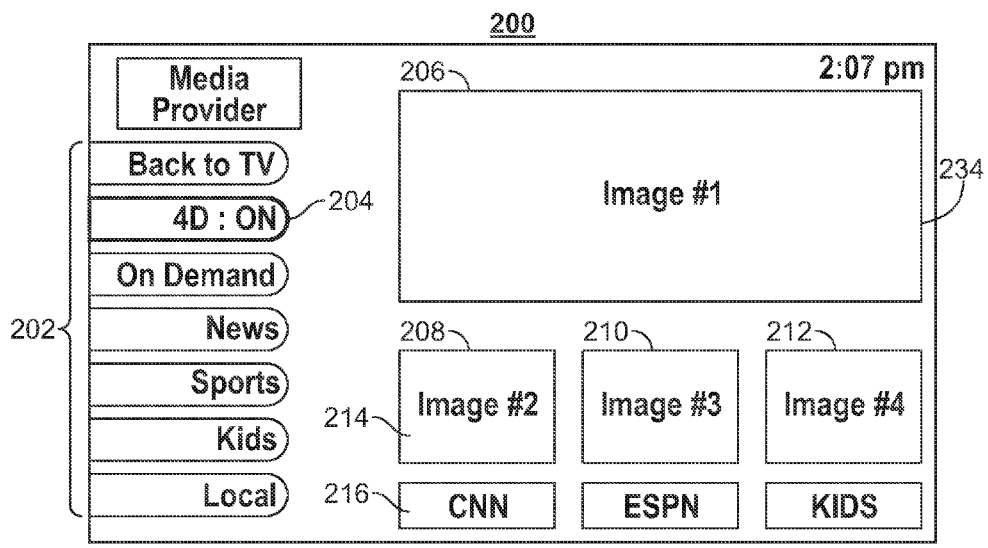
FIG. 2 shows an illustrative media guidance application for enhancing viewer experience in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
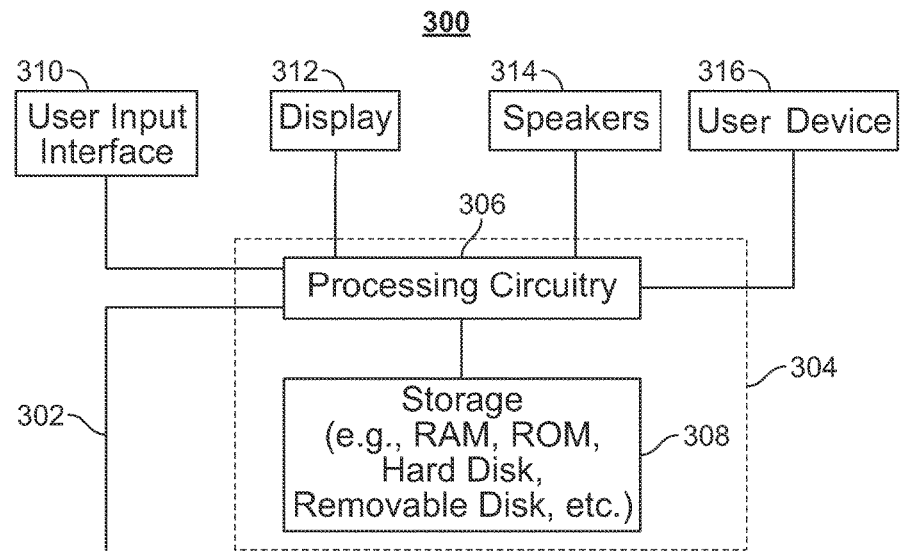
FIG. 3 is a block diagram of an illustrative media system in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
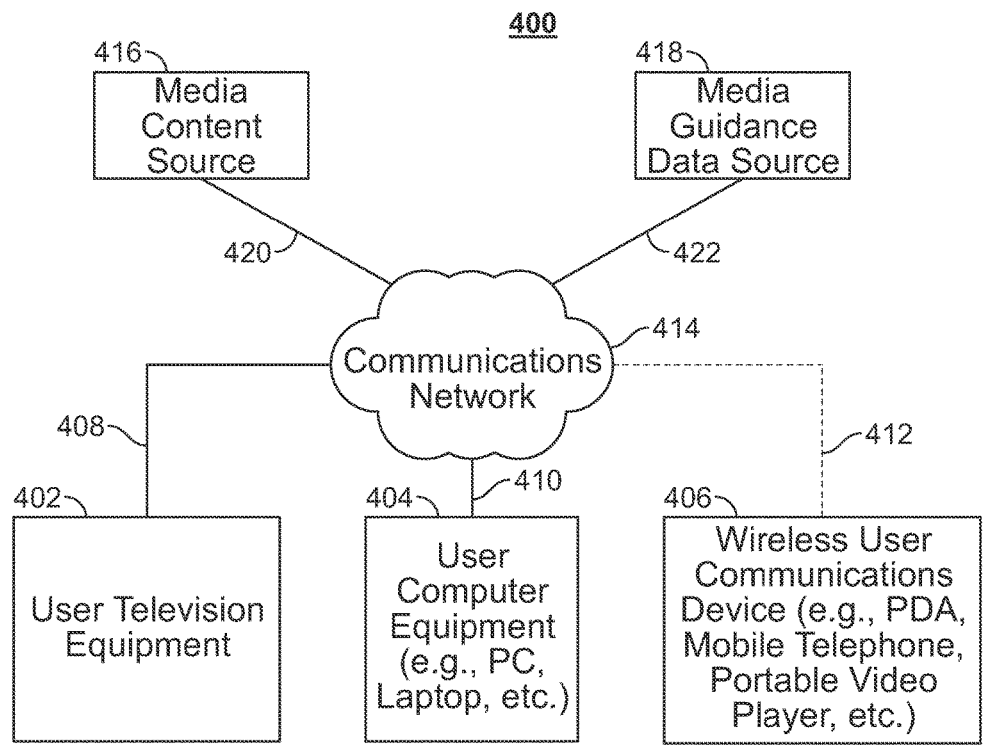
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Figure 5:
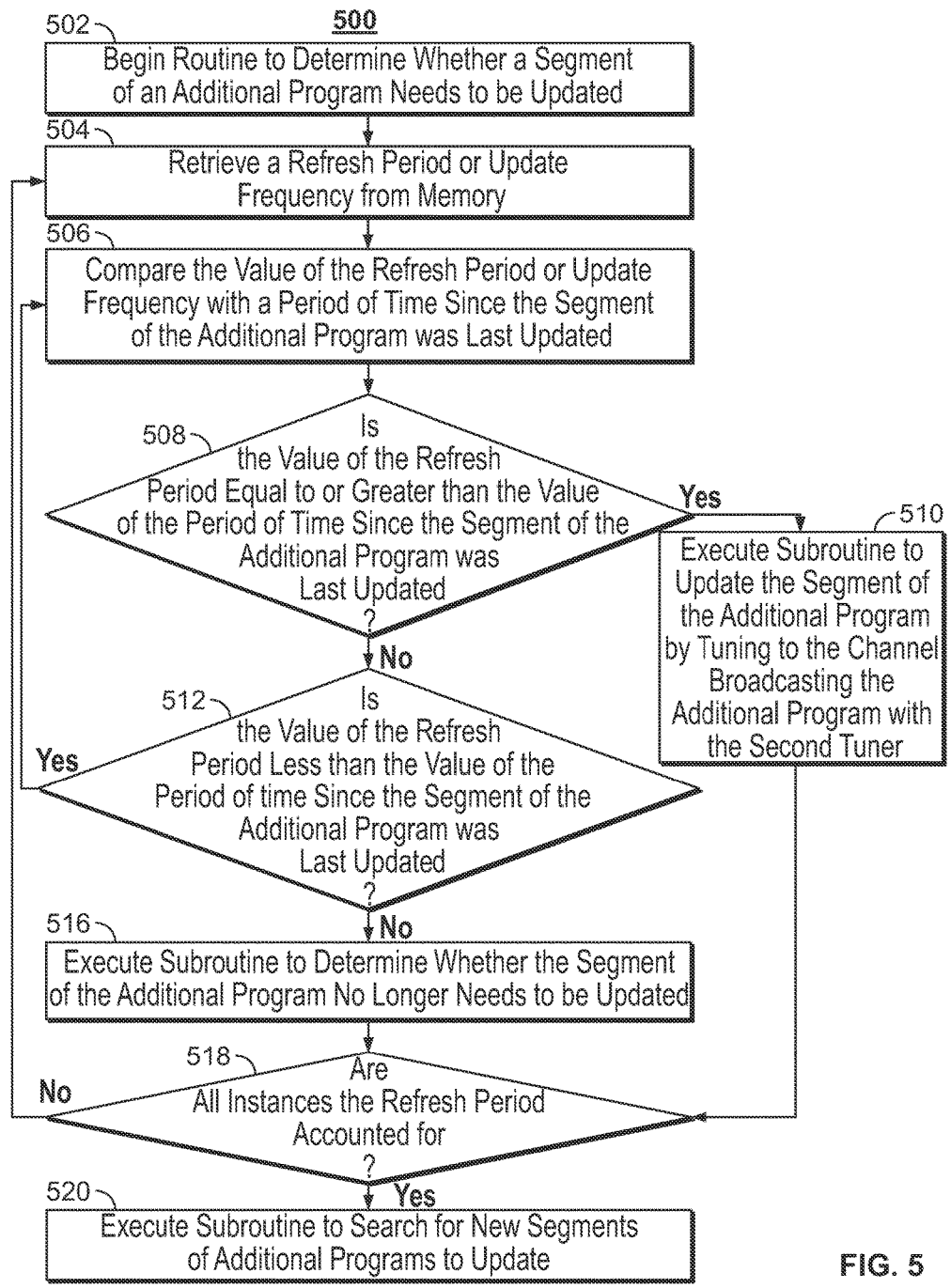
FIG. 5 is a flowchart of illustrative steps involved in determining whether a segment of an additional program of interest generated for display in a picture-in-picture window needs to be updated, in accordance with some embodiments of the disclosure.

FIG. 5 is a flowchart of illustrative steps involved in determining whether a segment of an additional program of interest generated for display in a picture-in-picture window needs to be updated, in accordance with some embodiments of the disclosure;

FIG. 6 is exemplary pseudocode of an algorithm for determining whether a segment of an additional program of interest generated for display in a picture-in-picture window needs to be updated, in accordance with some embodiments of the disclosure. In some embodiments the algorithm of FIGS. 5 and 6 are encoded on to non-transitory storage medium (e.g., storage device 308) as a set of instructions to be decoded and executed by processing circuitry (e.g., processing circuitry 306). Processing circuitry in turn provides instructions to other sub-circuits contained within control circuitry 304, such as the tuning, video generating, encoding, decoding, encrypting, decrypting, scaling, analog/digital conversion circuitry, and the like.

The flowchart in FIG. 5 describes an algorithm for control circuitry (e.g., control circuitry 304) to determine whether a segment of an additional program of interest needs to be updated or refreshed in accordance with some embodiments of the disclosure.

At step 502, control circuitry 304 determines whether a segment of an additional program of interest needs to be updated will begin based on whether segments of additional programs of interest are being generated for display. In some embodiments, this is done either directly or indirectly in response to a user action or input (e.g., from signals received by control circuitry 304 or user input interface 310). For example, process 500 begins directly in response to control circuitry 304 receiving signals from user input interface 310, or control circuitry 304 prompts the user to confirm their input using a display (e.g., by generating a prompt to be displayed on display 312) prior to running the algorithm.

At step 504, control circuitry 304 proceeds to retrieve the next instance of a refresh period or update frequency from memory. In some embodiments control circuitry 304 receives a single primitive data structure that represents the value of a refresh period or update frequency. In some embodiments the value is stored as part of a larger data structure, and control circuitry 304 retrieves the value by executing appropriate accessor methods to retrieve the value from the larger data structure.

At step 506, control circuitry 304 proceeds to compare the value of the refresh period or update frequency to the stored value of a time period since a segment of the additional program of interest generated for display in a picture-in-picture window was last updated. In some embodiments, the value of the time period since a segment of the additional program of interest generated for display in a picture-in-picture window was last updated is stored (e.g., on storage device 308) prior to beginning the algorithm. In some embodiments the value of the time period since a segment of the additional program of interest generated for display in a picture-in-picture window was last updated is also retrieved for each and every instance of update frequency or refresh period and the value of the time period since a segment of the additional program of interest generated for display in a picture-in-picture window was last updated changes from iteration to iteration. In some embodiments, control circuitry 304 directly compares the value of the time period since a segment of the additional program of interest generated for display in a picture-in-picture window was last updated with the value of the refresh period or update frequency by accessing the values respectively from memory and performing a value comparison. In some instances, control circuitry 304 calls a comparison function (e.g., for object to object comparison) to compare the update period or refresh frequency and the time period since a segment of the additional program of interest generated for display in a picture-in-picture window was last updated.

At step 508, control circuitry 304 compares the values of the update frequency or refresh period and the time period since a segment of the additional program of interest generated for display in a picture-in-picture window was last updated to determine if the value of the update frequency or refresh period is equal to or greater than the value of the time period since a segment of the additional program of interest generated for display in a picture-in-picture window was last updated. If the condition is satisfied, the algorithm proceeds to step 510; if the condition is not satisfied, the algorithm proceeds to step 512 instead.

At step 510, control circuitry 304 will execute a subroutine to update the segment of the additional program of interest generated for display in a picture-in-picture window by tuning to the channel broadcasting the additional program of interest with the second tuner, based on the condition at step 508 being satisfied. After the subroutine is executed, the algorithm proceeds to step 518 where it is determined if all instances of the refresh period or update frequency are accounted for and further iterations are needed.

At step 512, control circuitry 304 compares the values of the refresh period or update frequency and a time period since a segment of the additional program of interest generated for display in a picture-in-picture window was last updated to determine if the value of the update frequency or refresh period is less than the value of the time period since a segment of the additional program of interest generated for display in a picture-in-picture window was last updated. If the condition is satisfied, the algorithm proceeds back to step 506; if the condition is not satisfied, the algorithm proceeds to step 516 instead.

At step 516, control circuitry 304 will execute a subroutine to determine whether the segment of the additional program no longer needs to be updated based on both of the conditions in 508 and 512 not being satisfied. After the subroutine is executed, the algorithm proceeds to 518 where it is determined if all instances of the refresh period or update frequency are accounted for and if further iterations are needed.

At step 518, control circuitry 304 will check if all instances of the refresh period or update frequency are accounted for. If all of the instances have been evaluated, control circuitry 304 proceeds to step 520. For example, control circuitry 304 calls a function to see if there is a new segment of an additional program of interest that may need to be updated. If the function returns true (i.e., there are still segments of additional programs of interest that need to be processed), control circuitry 304 proceeds to step 504.

At step 520, control circuitry 304 will execute a subroutine to determine whether there is a new segment of an additional program of interest that needs to be updated.

It is contemplated that the descriptions of FIG. 5 may be used with any other embodiment of this disclosure. In addition, the descriptions described in relation to the algorithm of FIG. 5 may be done in alternative orders or in parallel to further the purposes of this disclosure. For example, conditional statements and logical evaluations, such as those at 508 and 512, may be performed in any order or in parallel or simultaneously to reduce lag or increase the speed of the system or method. As a further example, in some embodiments several instances of refresh frequencies or update periods may be evaluated in parallel, using multiple logical processor threads, or the algorithm may be enhanced by incorporating branch prediction. Furthermore, it should be noted that the algorithm of FIG. 5 may be implemented on a combination of appropriately configured software and hardware, and that any of the devices or equipment discussed in relation to FIGS. 3-4 could be used to implement one or more portions of the algorithm.

The pseudocode in FIG. 6 describes an algorithm to determine whether a segment of an additional program needs to be updated in accordance with some embodiments of the disclosure. It will be evident to one skilled in the art that the algorithm described by the pseudocode in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, control circuitry 304 runs a subroutine to initialize variables and prepare to determine whether a segment of an additional program of interest needs to be updated, which begins on line 605. For example, in some embodiments control circuitry 304 copies instructions from non-transitory storage medium (e.g., storage device 308) into RAM or into the cache for processing circuitry 306 during the initialization stage. Additionally, in some embodiments the value of the period since the segment of the additional program was updated is being used for comparison, or a tolerance level for determining if two values are essentially equivalent, are retrieved, set, and stored at 601.

At line 605, control circuitry 304 receives instances of the refresh period or update frequency. In some embodiments these instances are retrieved from memory. Control circuitry 304 receives instances of the refresh period or update frequency by receiving, for example, a pointer to an array of values of the refresh period or update frequency. In another example, control circuitry 304 receives an object of a class, such as an iterator object containing elements of the refresh period or update frequency.

At line 606, control circuitry 304 iterates through the various instances of the refresh period or update frequency, if only a single instance is available, the loop will only execute once. This loop is implemented in multiple fashions depending on the choice of hardware and software language used to implement the algorithm of FIG. 6; for example, this is implemented as part of a "for" or "while" loop.

At line 607, control circuitry 304 will store the value of the refresh period or update frequency into a temporary variable "A." In some embodiments the value of the refresh period or update frequency will be stored as part of a larger data structure or class, and the value of the refresh period or update frequency is obtained through appropriate accessor methods. In some embodiments the refresh period or update frequency is converted from a string or other non-numeric data type into a numeric data type by means of an appropriate hashing algorithm. In some embodiments, control circuitry 304 calls a function to perform a comparison of the refresh period or update frequency to a time period since the segment of the additional program was updated. In some embodiments the refresh period or update frequency is encoded as a primitive data structure, and rather than using a temporary variable, the refresh period or update frequency is directly used in the comparisons at lines 609 and 611.

At line 608, control circuitry 304 will store the value of a time period since the segment of the additional program was updated into a temporary variable "B." Similar to the refresh period or update frequency, in some embodiments the value of the time period since the segment of the additional program was updated will be stored as part of a larger data structure or class, and the value of the time period since the segment of the additional program was updated is obtained through accessor methods. In some embodiments the time period since the segment of the additional program was updated is converted from a string or other non-numeric data type into a numeric data type by means of an appropriate hashing algorithm, or the time period since the segment of the additional program was updated is a primitive data structure, and is directly used in the comparisons at lines 609 and 611.

At line 609, control circuitry 304 compares the value of A to the value of B to see if they are essentially equivalent. This is achieved by subtracting the value of B from A, taking the absolute value of the difference, and then comparing the absolute value of the difference to a predetermined tolerance level. In some embodiments the tolerance level is a set percentage of either A or B. In some embodiments the tolerance level is a fixed number. For example, setting the tolerance level to a set multiple of machine epsilon allows for the algorithm to account for small rounding errors that result from the use of floating point arithmetic. In some embodiments the tolerance level is set to zero, or the condition inside the IF statement is replaced with a strict equivalence between A and B.

At line 610, control circuitry 304 will execute a subroutine to determine default update settings using control circuitry if the condition in line 609 is satisfied. In some embodiments this is achieved by processing circuitry 306 sending the appropriate signals to the control circuitry.

At line 611, control circuitry 304 will compare the value of A and B to determine if A is less than B. In some embodiments this comparison will only be done if A is not essentially equivalent to B and the comparison in line 609 evaluates to FALSE.

At line 612, control circuitry 304 will execute a subroutine to keep checking the period since the segment of the additional program was updated using control circuitry if the condition in line 611 is satisfied.

At line 613, control circuitry 304 will determine whether neither condition in line 609 or 611 are satisfied. If neither condition is satisfied, then the instruction at line 614 are evaluated and executed.

At line 614, control circuitry 304 will execute a subroutine to update the segment of the additional program using control circuitry if neither of the conditions at lines 609 or 611 are satisfied.

At line 615, control circuitry 304 will execute a subroutine to search for new segments of additional programs to update using control circuitry.

At line 616, control circuitry 304 runs a termination subroutine after the algorithm has performed its function. For example, in some embodiments control circuitry 304 destructs variables, performs garbage collection, frees memory or clears the cache of processing circuitry 306.

It will be evident to one skilled in the art that the algorithm described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions are placed after lines 610 and 612 to speed operation, or the conditional statements are replaced with a case-switch. In some embodiments, rather than iterating over all instances of the update frequency or refresh period at step 506, in some embodiments the code is rewritten so control circuitry 304 is instructed to evaluate multiple instances of the update frequency or refresh period simultaneously on a plurality of processors or processor threads, lowering the number of iterations needed and potentially speeding up computation time.

Figure 7:
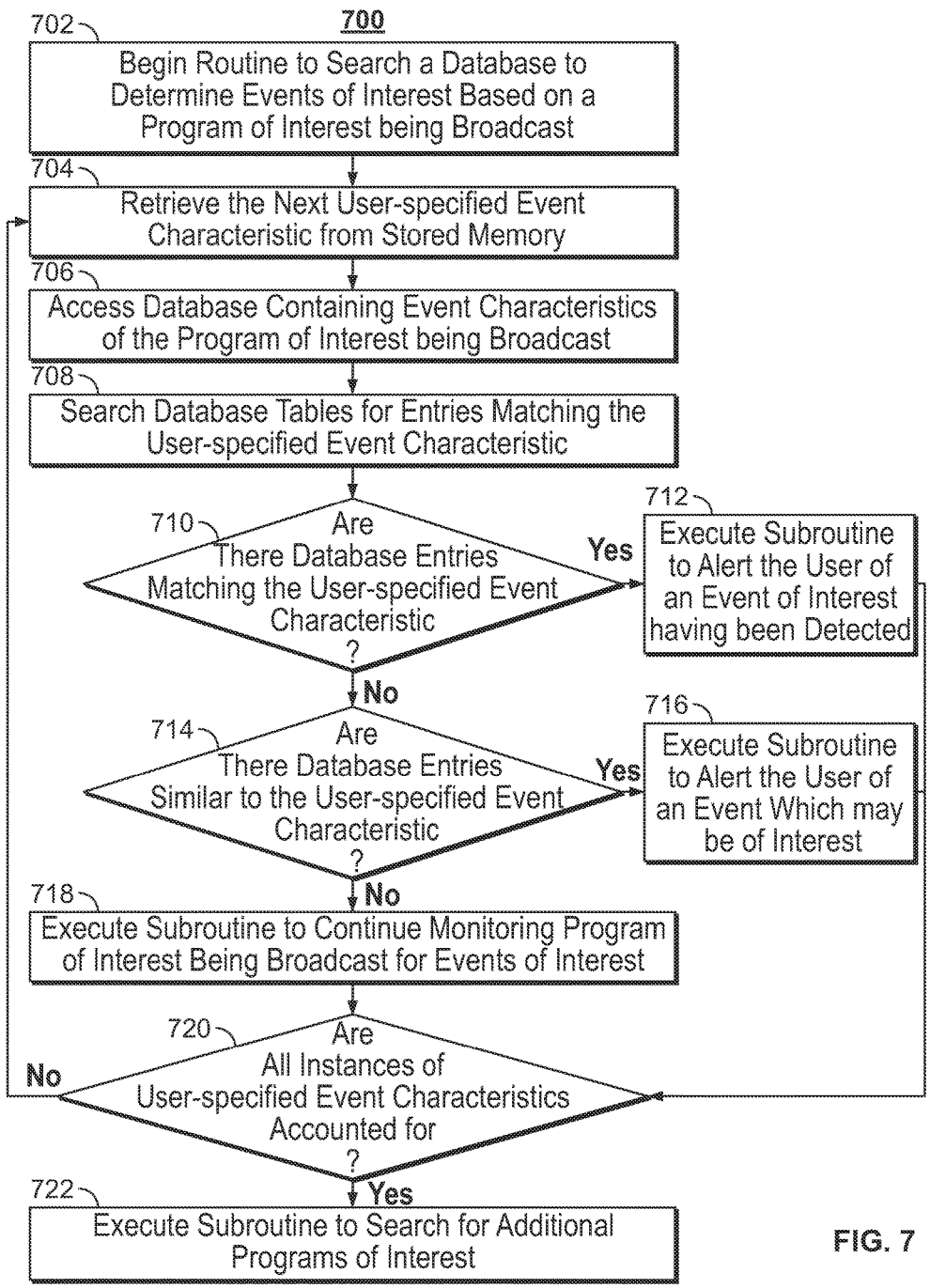
FIG. 7 is a flowchart of illustrative steps involved in determining events of interest in a program of interest, using a database containing event characteristics associated with a program of interest and user-specified event characteristics, in accordance with some embodiments of the disclosure.

FIG. 7 is a flowchart of illustrative steps involved in determining events of interest in a program of interest, using a database containing event characteristics associated with a program of interest and user-specified event characteristics, in accordance with some embodiments of the disclosure. FIG. 8 is exemplary pseudocode of an algorithm for determining events of interest in a program of interest, using a database containing event characteristics associated with a program of interest and user-specified event characteristics, in accordance with some embodiments of the disclosure.

Similar to the algorithms described by FIGS. 5 and 6, in some embodiments the algorithm of FIGS. 7 and 8 are encoded on to non-transitory storage medium (e.g., storage device 308) as a set of instructions to be decoded and executed by processing circuitry (e.g., processing circuitry 306). Processing circuitry in turn provides instructions to other sub-circuits contained within control circuitry 304, such as the tuning, video generating, encoding, decoding, encrypting, decrypting, scaling, analog/digital conversion circuitry, and the like.

The flowchart in FIG. 7 describes an algorithm for control circuitry (e.g., control circuitry 304) to search a database and determine events of interest in accordance with some embodiments of the disclosure.

At step 702, the algorithm to search a database and determine events of interest will begin based on a program of interest being broadcast. In some embodiments, this is done either directly or indirectly in response to a user action or input (e.g., from signals received by control circuitry 304 or user input interface 310.)

At step 704, control circuitry 304 proceeds to retrieve the next instance of a user-specified event characteristic from stored memory. In some embodiments control circuitry 304 retrieves a single primitive data structure that represents the value of the user-specified event characteristic. In some embodiments control circuitry 304 retrieves the value from a larger class or data structure.

At step 706, control circuitry 304 accesses a database containing possible values of event characteristics of the program of interest being broadcast. In some embodiments, this database is stored locally (e.g., on storage device 308) prior to beginning the algorithm. In some embodiments the database is also accessed by using communications circuitry to transmit information across a communications network (e.g., communications network 414) to a database implemented on a remote storage device (e.g., media guidance data source 418).

At step 708, control circuitry 304 searches database tables for entries matching the user-specified event characteristic. In some embodiments this is done by comparing an identifier, for example, a string or integer representing the user-specified event characteristic, that matches the types of identifiers used inside the database. In some embodiments control circuitry 304 submits a general query to the database for table entries matching the user-specified event characteristic, and control circuitry 304 receives a list of indices or a data structure containing a portion of the database contents. In some embodiments the database implements a junction table that in turn cross-references entries from other databases. In this case, control circuitry 304 retrieves indices from a first database that in turn can be used to retrieve information from a second database. Although we describe control circuitry 304 interacting with a single database for purposes of clarity, it is understood that the algorithm of FIG. 7 may be implemented using multiple independent or cross-referenced databases.

At step 710, control circuitry 304 determines if there are database entries matching the user-specified event characteristic. In some embodiments control circuitry 304 receives a signal from the database indicating that there are no matching entries. In some embodiments control circuitry 304 instead receives a list of indices or data structures with a NULL or dummy value. If control circuitry 304 identifies that there are database entries matching the user-specified event characteristic the algorithm proceeds to step 712, otherwise the algorithm proceeds to step 714.

At step 712, control circuitry 304 will execute a subroutine to alert the user of an event of interest having been detected. Afterwards, the algorithm proceeds to step 720 where it is determined if there are further instances of the user-specified event characteristic that need to be accounted for.

At step 714, control circuitry 304 determines if there are database entries similar to the user-specified event characteristic. For example, in some embodiments, if the user-specified event characteristic is encoded as a string with multiple characters, control circuitry 304 performs additional database queries for similar strings with individual characters replaced, removed or added. In some embodiments control circuitry 304 also determines if the original query was a commonly misspelled word, and will submit a query with the correct spelling instead. In another example, the user-specified event characteristic is encoded as an integer; control circuitry 304 performs additional queries for other integers within a certain range. In some embodiments control circuitry 304 retrieves database entries similar to the user-specified event characteristic without requiring further queries. If control circuitry 304 identifies that there are database entries similar to the user-specified event characteristic, the algorithm proceeds to step 716; otherwise the algorithm proceeds to step 718.

At step 716, control circuitry 304 will execute a subroutine to alert the user of an event which may be of interest. Afterwards, the algorithm proceeds to step 720.

At step 718, control circuitry 304 will execute a subroutine to continue monitoring the program of interest being broadcast for events of interest matching other user-specified event characteristics after determining that there were no matching database entries for the user-specified event characteristic. Afterwards, the algorithm proceeds to step 720.

At step 720, control circuitry 304 will determine if all instances of the user-specified event characteristic are accounted for and if further iterations are needed. If further iterations are needed the algorithm will loop back to step 704 where control circuitry 304 will retrieve the next instance of the user-specified event characteristic. If no further iterations are needed the algorithm will proceed to step 722.

At step 722, control circuitry 304 will execute a subroutine to search for additional programs of interest.

It is contemplated that the descriptions of FIG. 7 may be used with any other embodiment of this disclosure. In addition, the descriptions described in relation to the algorithm of FIG. 7 may be done in alternative orders or in parallel to further the purposes of this disclosure. For example, control circuitry 304 submits multiple queries to the database in parallel, or it submits multiple queries to a plurality of similar databases in order to reduce lag and speed the execution of the algorithm. As a further example, although step 712 and step 716 are described as being mutually exclusive, both exact entries and similar entries are processed for a single instance of the user-specified event characteristic. To further this purpose, in some embodiments step 710 and step 714 are performed in parallel by control circuitry 304. Furthermore, it should be noted that the algorithm of FIG. 7 is be implemented on a combination of appropriately configured software and hardware, and that any of the devices or equipment discussed in relation to FIGS. 3-4 could be used to implement one or more portions of the algorithm.

The pseudocode in FIG. 8 describes an algorithm to search a database for events of interest based on user-specified characteristics in accordance with some embodiments of the disclosure. It will be evident to one skilled in the art that the algorithm described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, the algorithm runs a subroutine to initialize variables and prepare to search a database for events of interest based on user-specified characteristics, which begins on line 805. For example, in some embodiments control circuitry 304 copies instructions from non-transitory storage medium (e.g., storage device 308) into RAM or into the cache for processing circuitry 306 during the initialization stage.

At line 805, control circuitry 304 receives instances of a user-specified event characteristic. In some embodiments these instances are retrieved from stored memory or acquired through user input.

At line 806, control circuitry 304 iterates through the various instances of the user-specified event characteristic; if only a single instance is available, the loop will only execute once. This loop is implemented in multiple fashions depending on the choice of hardware and software language used to implement the algorithm of FIG. 8; for example, this is implemented as part of a "for" or "while" loop, in some programming languages. In some embodiments it is convenient to store the instances of the user-specified event characteristic in a single class or encapsulated data structure that will perform the loop as part of an internal method.

At line 807, control circuitry 304 queries a database for entries matching the user-specified event characteristic. Depending on how the database is implemented and how the user-specified event characteristic is stored, an intermittent step is required to convert the user-specified event characteristic into a form consistent with the database. For example, the user-specified event characteristic is encoded into a string or an integer using an appropriate hashing algorithm prior to being transmitted to the database by control circuitry 304 as part of a query. In some embodiments the user-specified event characteristic is encoded as a primitive data structure, and control circuitry 304 submits the user-specified event characteristic as a query to the database directly. After querying the database, control circuitry 304 receives a set of database entries matching the user-specified event characteristic. In some embodiments control circuitry 304 receives these entries in the form of a data-structure, a set of indices of the database, or a set of indices of another cross-referenced database.

At line 808, control circuitry 304 will determine if there are any database entries matching the user-specified event characteristic. In some embodiments control circuitry 304 determines this by checking if the database returned an empty data structure or a NULL value in response to the query in line 807. If there are matching database entries the algorithm proceeds to line 809. If there were no matching database entries the algorithm instead proceeds to line 812.

At line 809, control circuitry 304 retrieves one or more values of the event characteristic associated with a segment of a program from the database entries matching the user-specified event characteristic. For example, if control circuitry 304 retrieves a list of indices after querying the database in line 807, in some embodiments control circuitry 304 retrieves the database entries for the event characteristic associated with a segment of a program located at the received indices. In some embodiments the indices points to a larger data structure contained within the database, and control circuitry 304 retrieves the values of the event characteristic associated with a segment of a program from within the data structure using appropriate accessor methods. In some embodiments control circuitry 304 retrieves the values of the event characteristic associated with a segment of the program and store them in a separate data structure locally (e.g., in storage 308) prior to proceeding further.

After retrieving the values of the event characteristic associated with a segment of the program, the algorithm will proceed to line 810.

At line 810, control circuitry 304 will execute a subroutine to use the values of the event characteristic associated with a segment of the program and notify the user of an event having been detected using control circuitry, e.g., control circuitry 304. Afterwards, the algorithm proceeds to line 815.

At line 811, control circuitry 304 determines if there are any database entries similar to the user-specified event characteristic. For example, the user-specified event characteristic is represented by an object of a class. Control circuitry 304 calls a function to perform a fuzzy comparison (e.g., a comparison to identify similar objects of the class) by comparing specific fields of the class or by performing approximate string matching on data related to the user-specified event characteristic. If database entries similar to the user-specified event characteristic are found by control circuitry 304 then the algorithm proceeds to line 812. If control circuitry 304 does not find matching entries (e.g., a query to the database returns a NULL value), the algorithm proceeds to line 812.

At line 812, control circuitry 304 will execute a subroutine to use the values of the event characteristic associated with a segment of the program and notify the user of an event that may be of interest having been detected using control circuitry. Afterwards, the algorithm proceeds to line 815.

At line 811, control circuitry 304 will have determined that there were no database entries matching the user-specified event characteristic. In this case, the algorithm will proceed to line 812.

At line 812, control circuitry 304 will execute a subroutine to notify the user of an event that may be of interest having been detected using control circuitry. Afterwards, the algorithm proceeds to line 814.

At line 814, control circuitry 304 will execute a subroutine to continue monitoring the program of interest using control circuitry if neither of the conditions at lines 609 or 611 are satisfied.

At line 815, control circuitry 304 will execute a subroutine to search for additional programs of interest using control circuitry. Afterwards, the algorithm proceeds to the termination subroutine at line 817.

At line 817, control circuitry 304 executes a termination subroutine after the algorithm has performed its function and all instances of the user-specified event characteristic have been processed and checked against the database. For example, in some embodiments control circuitry 304 destructs variables, performs garbage collection, frees memory or clears the cache of processing circuitry 306.

It will be evident to one skilled in the art that the algorithm described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code is re-written so control circuitry 304 is instructed to evaluate multiple instances of the user-specified event characteristic and submit multiple database queries simultaneously using a plurality of processors or processor threads. It is also understood that although we may describe control circuitry 304 interacting with a single database, this is only a single embodiment described for illustrative purposes, and the algorithm of FIG. 8. may be implemented using multiple independent or cross-referenced databases. For example, a database stored locally (e.g., on storage 308) indexes or cross-references a database stored remotely (e.g., media guidance data source 418), which is accessible through any number of communication channels (e.g., communications network 414). In some embodiments, this allows control circuitry 304 to utilize a look-up table or database front-end efficiently stored on a small local drive to access a larger database stored on a remote server on demand.

Figure 9:
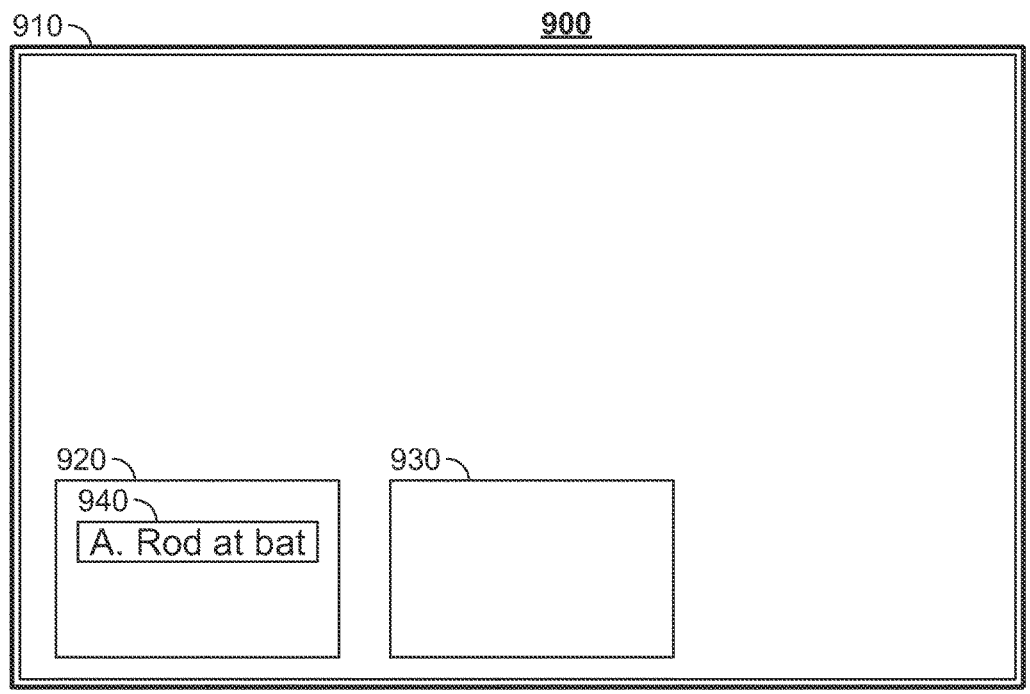
FIGS. 9 and 10 show an illustrative media guidance application for enhancing viewer experience in accordance with some embodiments of the disclosure.

FIG. 9 shows an illustrative media guidance application for enhancing viewer experience in accordance with some embodiments of the disclosure. A display device 900 includes a main display area 910, and two additional display areas 920 and 930. The additional display areas 920 and 930 may be located anywhere within the main display area 910. The additional display areas may be overlays. Alternatively, the additional display areas may obstruct an image shown in main display area 910. In alternative embodiments, main display area 910 may include only one additional display area 920. In alternative embodiments, main display area 910 may include more than two additional display areas 920 and 930. For example, a user may be watching "Mission Impossible," which is broadcast on Channel 4 in main display area 910. Simultaneously, the Bruins may be playing the Canadiens in the pre-season, and the user may want to keep track of the score in additional display area 930. Accordingly, in this exemplary embodiment, additional display area 930 may show the score recap of the "Bruins-Canadiens" game from the NHL network. Additionally, the user may also want to see highlights from the "Red Sox-Yankees" series, because Alex Rodriguez is one of the user's favorite players. Accordingly, in this exemplary embodiment, additional display area 920 shows the Red Sox-Yankees game from the MLB network. In addition, the user can indicate preferences in his profile, or in a set-up screen. For example, the user can indicate in his profile his favorite teams (e.g., the Bruins, the Red Sox and the Patriots) as well as his favorite players (e.g., Nicklas Backstrom and Alex Rodriguez). In this example, because Alex Rodriguez is a favorite player for the user, additional features may exist, such as generating for display a notification 940 to the user that Alex Rodriguez is now at bat.

In on example, the favorite team or player of a particular user (e.g., Nicklas Backstrom or Alex Rodriguez in this example) can be downloaded by connecting to a social network. Similarly, a user who is a fan of Tom Brady may have liked fan pages, pictures, videos or statuses for Brady, the Patriots, Belichick, on several social networking platforms. The media guidance application may automatically download any indications of a user interest through social media to be able to flag events associated with the social media pages, pictures or videos as events of interest for the user.

Figure 10:
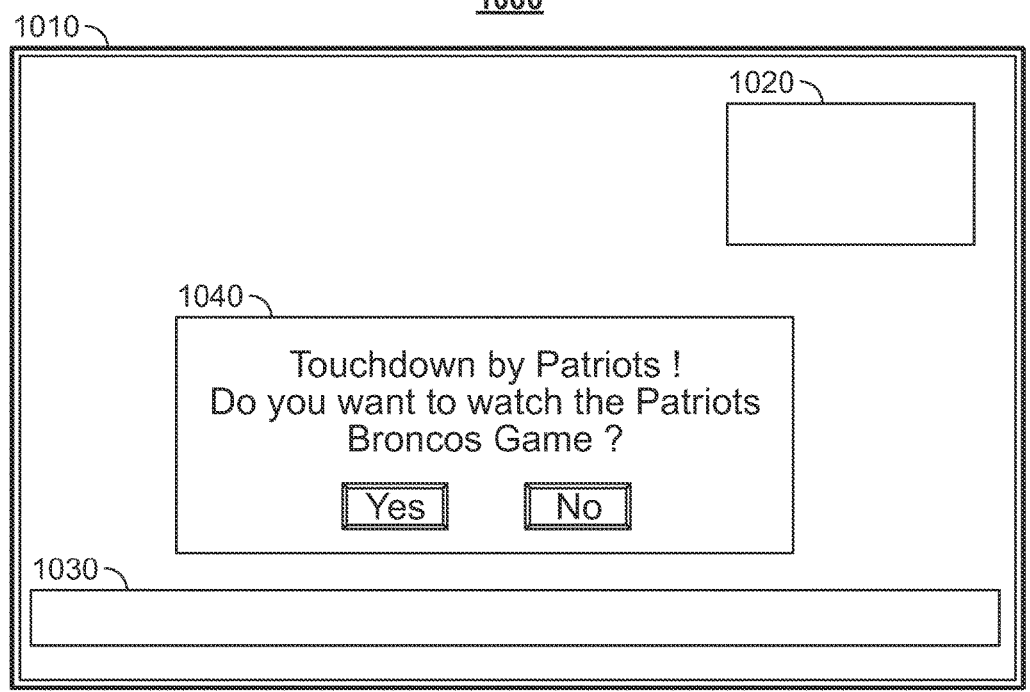

FIG. 10 shows an illustrative media guidance application for enhancing viewer experience in accordance with some embodiments of the disclosure. In this exemplary embodiment, a display device 1000 includes a main display area 1010, and additional display areas 1020 and 1030. For example, main display area 1010 may be showing the Hockey World Championships. At the same time, in additional display area 1020, the movie "Salt" may be generated for display. For example, this allows the user to keep track of the Hockey Championships, but to switch channels when the additional display area 1020 shows that the commercial break is over in "Salt." In addition, the additional display area 1030 may include additional information in a ticker tape format. For example, additional area 1030 can include scores for the Red Sox-Yankees game. In another example, additional area 1030 can show stock prices, and in particular additional area 1030 can show stock prices for stocks that a user has indicated as being of interest to him/her via a user profile or a set-up menu. Additional display areas 1020 and 1030 may include static displays (e.g., a fixed image that is updated periodically), or may include a moving display (e.g., moving as seen by the user in view of the update frequency used). In addition, notifications of events of interest to the user may appear as an overlay to main display area 1010, as shown for example with notification 1040. The notification may be related to an event detected in a program shown in one of the additional display areas, or may be an event detected in a program that is not currently shown in one of the additional display areas. For example, notification 1040 indicates "Touchdown—Patriots" and "Do you want to watch the Patriots-Broncos game?," along with "yes" and "no" selectable options. Accordingly, the user may decide to select "yes" and begin watching the Patriots-Broncos game in main area 1010 of the display device. Alternatively, the user may select "no" and continue watching the World Hockey Championships in the main area 1010 of the display device. Alternatively, if the system does not receive a selection of "yes" or "no," the notification 1040 may automatically disappear after a predetermined time.

Figure 11:
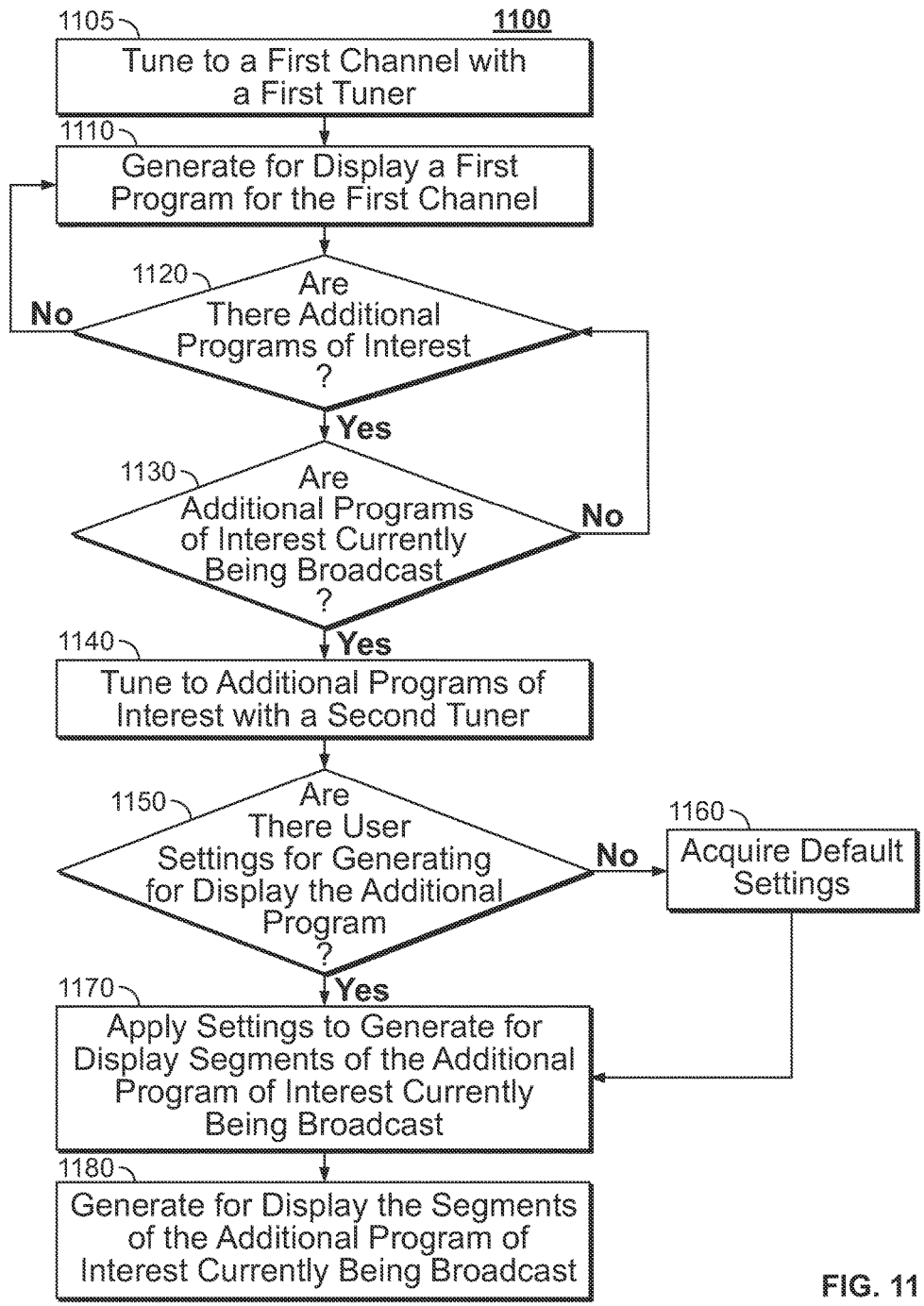
FIG. 11 is a flowchart of illustrative steps involved in enhancing viewer experience, in accordance with some embodiments of the disclosure.

FIG. 11 is a flowchart of illustrative steps involved in enhancing viewer experience, in accordance with some embodiments of the disclosure. It should be noted that process 1100 or any step thereof could be performed on, or provided by, any of the devices shown in FIGS. 3-5. For example, process 1100 may be executed by control circuitry 304 (FIG. 3) as instructed by a media guidance application implemented on a user device 316 (FIG. 3) in order to enhance the viewing experience of a user. In addition, one or more steps of process 1100 may be incorporated into or combined with one or more steps of any other process or embodiment (e.g., process 1200 (FIG. 12)).

At step 1105, the media guidance application tunes, via control circuitry 304 (FIG. 3), to a first channel with a first tuner. For example, via control circuitry 304, the media guidance application tunes to "Rangers-Capitals" broadcast from 7-10 pm EST on the NHL network.

At step 110, the media guidance application (e.g., implemented on illustrative user equipment device 300 (FIG. 3)) generates for display a first program from a first channel. For example, the media guidance application generates for display (e.g., on display device 312 (FIG. 3)) the "Rangers-Capitals" game which is broadcast by the NHL network.

At step 1120, the media guidance application determines, via control circuitry 304 (FIG. 3), whether there are additional programs of interest to the user. In the event that there are no additional programs of interest to the user, the media guidance application returns to step 1110 and continues to generate for display the first program from the first channel, on display element 312 (FIG. 3). In the event that there are additional programs of interest to the user, the media guidance application determines, via control circuitry 304 (FIG. 3), at step 1130 whether there are additional programs of interest that are currently being broadcast. For example, the media guidance application determines that "Out of Africa" is also being broadcast on channel 82, and "Family Guy" is being broadcast on channel 122 during the same 7-10 pm EST window. Alternatively, the media guidance application determines that there are other programs of interest which overlap partially with the "Rangers-Capitals" game. For example, "Cowboys and Aliens" is broadcast from 8-10 pm EST.

At step 1130, the media guidance application determines, via control circuitry 304 (FIG. 3), whether there are additional programs of interest that are currently being broadcast. For example, as noted above, the media guidance application determines that "Out of Africa" and "Family Guy" are additional programs of interest currently being broadcast while the media guidance application is generating for display the "Rangers-Capitals" game. In the event that none of the determined additional programs of interest are currently being broadcast, the media guidance application returns to step 1120 and determines again whether there are any additional programs of interest. Alternatively, if the media guidance application determines at step 1130 that there are additional programs of interest that are currently being broadcast, then the media guidance application tunes, via control circuitry 304 (FIG. 3), to the identified additional programs of interest currently being broadcast with a second tuner, at step 1140.

At step 1140, the media guidance application tunes via control circuitry 304 (FIG. 3), to the identified additional programs of interest that are currently being broadcast, with a second tuner. For example, the media guidance application tunes, with the second tuner, to channel 82 for "Out of Africa" and then tunes, with the second tuner, to channel 122 for "Family Guy."

At step 1150, the media guidance application determines via control circuitry 304 (FIG. 3), whether there are user settings for displaying the additional programs that were identified as being of interest and currently broadcast in steps 1120 and 1130. For example, a user may have priority settings for generating for display certain types of programs over others. Alternatively, a user may define preferences regarding the type or size of the display when additional programs are generated for display. In the event that there are no user settings for displaying the additional programs, the media guidance application acquires default settings for display of the additional programs, at step 1160. In the event that there are user settings for displaying the additional programs, the media guidance application proceeds to apply these settings at step 1170. For example, a user may have a preference for movies to use a 16:9 format when an additional program generated for display is a movie.

At step 1170, the media guidance application applies, via control circuitry 304 (FIG. 3), the user settings or default settings acquired in steps 1150 or 1160 to generate for display segments of the additional programs on display element 312 (FIG. 3). For example, the media guidance application applies a default setting for a movie to generate for display a segment with of the movie with closed captioning. Alternatively, the media guidance application applies a user-defined setting for a baseball game to generate for display only the score section.

At step 1180, the media guidance application generates for display the segments of the additional programs on display element 312 (FIG. 3).

Figure 12:
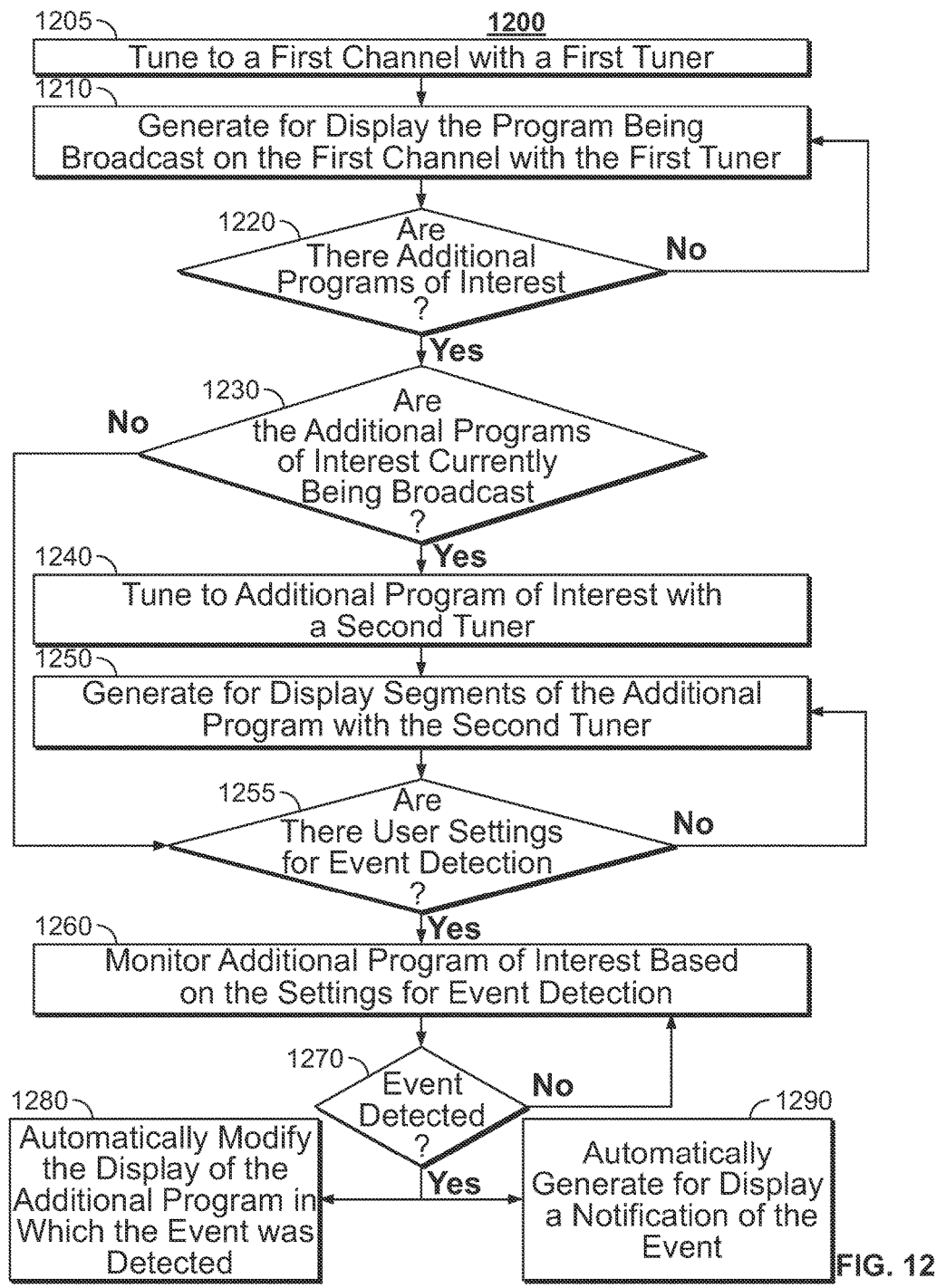
FIG. 12 is a flowchart of illustrative steps involved in enhancing viewer experience, in accordance with some embodiments of the disclosure.

FIG. 12 is a flowchart of illustrative steps involved in enhancing viewer experience, in accordance with some embodiments of the disclosure. It should be noted that process 1200 or any step thereof could be performed on, or provided by, any of the devices shown in FIGS. 3-5. For example, process 1200 may be executed by control circuitry 304 (FIG. 3) as instructed by a media guidance application implemented on a user device 316 (FIG. 3) in order to enhance the viewing experience of a user. In addition, one or more steps of process 1200 may be incorporated into or combined with one or more steps of any other process or embodiment (e.g., process 1100 (FIG. 11)).

At step 1205, the media guidance application (e.g., implemented on illustrative user equipment device 300 (FIG. 3) tunes to a first channel with a first tuner. For example, the media guidance application tunes to channel 220 which is broadcasting "Cowboys and Aliens."

At step 1210, the media guidance application generates for display the program being broadcast on the first channel on display device 312 (FIG. 3). For example, the media guidance application generates for display "Cowboys and Aliens."

At step 1220, the media guidance application determines, via control circuitry 304 (FIG. 3), whether there are additional programs of interest to the user. For example, the media guidance application determines that the user is interested in cooking shows and reality TV shows, and that "Hell's kitchen" and "The Real Housewives of the OC" are a cooking show and a reality TV show, respectively. In the event that the media guidance application does not detect additional programs of interest, the media guidance application returns to step 1210 and continues to generate for display the program being broadcast on the first channel. In the event that the media guidance application detects additional programs of interest, the media guidance application proceeds to step 1230.

At step 1230, the media guidance application determines, via control circuitry 304 (FIG. 3), whether any of the additional programs of interest detected at step 1220 are currently being broadcast. For example, the media guidance application determines that "Hell's kitchen" and/or "The Real Housewives of the OC" are currently being broadcast on different channels. In the event that no additional programs of interest are currently being broadcast, the media guidance application proceeds to step 1255 to determine whether there are user settings for event detection.

Alternatively, in the event that the media guidance application determines additional programs of interest that are currently being broadcast, the media guidance application proceeds to step 1240.

At step 1240, the media guidance application tunes, via control circuitry 304 (FIG. 3), to the identified additional programs of interest that are currently being broadcast, with a second tuner. For example, the media guidance application tunes, with the second tuner, to "Hell's Kitchen" on a first channel, and then tunes, with the second tuner to "The Real Housewives of the OC" on another channel.

At step 1250, the media guidance application generates for display the additional programs on display device 312 (FIG. 3). For example, the media guidance application generates for display "Hell's Kitchen" and "The Real Housewives of the OC" in picture-in-picture windows such as picture-in-picture windows 920 and 930 shown in FIG. 9.

At step 1255, the media guidance application determines, via control circuitry 304 (FIG. 3), whether there are user settings for event detection. In the event that there are no user settings for event detection, the media guidance application returns to step 1250 and generates for display the additional programs of interest with the second tuner. In the event that there are user settings for event detection, the media guidance application proceeds to step 1260.

At step 1260, the media guidance application monitors, via control circuitry 304 (FIG. 3), the additional programs of interest based on the user settings for event detection. For example, the media guidance application monitors programs of interest to determine additional events which match the user settings, e.g. a home run by a particular player or an event for a particular character.

At step 1270, the media guidance application determines, via control circuitry 304 (FIG. 3), whether an event has been detected. If no event has been detected, the media guidance application continues to monitor the additional programs of interest, and to compare features of these additional programs of interest with the user settings for event detection. If an event is detected, the media guide application proceeds to steps 1280 or 1290.

At step 1280, the media guidance application automatically modifies, via control circuitry 304 (FIG. 3), the display of the additional program in which the event was detected. For example, the media guidance application detects yelling from Gordon Ramsey in "Hell's Kitchen" which matches a user setting for "Gordon Ramsey is upset." In this example the media guidance application may generate for display a banner, (e.g., similar to banner 940 shown in FIG. 9) over a picture-in-picture window stating "Gordon Ramsey upset" or "Check this out." Alternatively, if no picture-in-picture window for "Hell's Kitchen" was previously generated for display, in response to the detection of Gordon Ramsey's yelling, the media guidance application may automatically generate for display a picture-in-picture window for "Hell's kitchen." Alternatively, the media guidance application may automatically generate for display an option to display "Hell's Kitchen" (e.g., similar to the notification 1040 for the "Patriots-Broncos" game in FIG. 10)

At step 1290, the media guidance application automatically generates for display, via control circuitry 304 (FIG. 3), a notification of the event. For example, as shown in FIG. 10B, the "Patriots-Broncos" game may have been detected as a program of interest because the user indicated that the Patriots were his favorite team. If the user also indicated that he was interested in scoring events, the media guidance application can monitor the Patriots-Broncos game, detect that a scoring event (e.g., a touchdown) occurred, and a provide a notification to the user.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for enhancing viewer experience, the method comprising:
  tuning to a first program with a first tuner;
    generating for display the first program on a display area of a display device;
    determining a second program of interest to a user and a third program of interest to the user, wherein the second program and the third program are being broadcasted;
    tuning, with a second tuner, to the second program and, simultaneously with the generating for display of the first program, generating for display a segment of the second program in a first portion of the display area on the display device;
tuning, with the second tuner, to the third program and, simultaneously with the generating for display of the first program and of the segment of the second program, generating for display a segment of the third program in a second portion of the display area on the display device; and
receiving a user selection of a frequency at which to update the second and third programs;
wherein the second tuner cycles between the second program and the third program based on the user selection of the frequency, while continuing to simultaneously generate for display the segment of the second program and the segment of the third program, to periodically update the segment of the second program in the first portion of the display area and the segment of the third program in the second portion of the display area.

2. The method of claim 1, wherein generating for display the segment of the second program includes:
selecting a subset of information from the second program, the subset of information including at least one of a video segment of the broadcast feed, a geographic portion of an image generated by the broadcast feed and a portion of metadata associated with the broadcast feed;
converting the subset of information into a new format;
generating the segment of the second program from the converted subset of information; and
generating for display the segment of the second program.

3. The method of claim 2, further comprising:
tuning with a third tuner, to a fourth program; and simultaneously with the generating for display the first, second and third programs,
generating for display a segment of the fourth program in a third portion of the display area on the display device, wherein the second tuner and the third tuner cycle between the second, third and fourth programs to periodically update the segments of the second, third and fourth programs.

4. The method of claim 3, wherein the segment of the second program includes a plurality of images, and wherein the plurality of images is cropped before the segment of the second program is generated for display.

5. The method of claim 3, further comprising:
cropping the segment of the second program before generating for display the segment of the second program; and
reformatting the segment of the second program to change one of the resolution or file type of the segment of the second program.

6. The method of claim 3, further comprising:
selecting a location and dimensions of the first portion of the display area on the display device, wherein the selecting is done by the user;
determining bounds of the first selected portion of the display area based on the location and dimensions;
cropping the segment of the second program to match the bounds; and
generating for display the segment of the second program in the selected first portion of the display area.

7. The method of claim 6, wherein the second and third programs of interest to the user are automatically determined based on user preferences.

8. The method of claim 1, further comprising, further in response to the detecting, causing an additional amount of the display area to include the first program by automatically closing the first portion of the display device while maintaining the generating for display of the segment of the third program in the second portion of the display device.

9. The method of claim 1, further comprising:
detecting the second program is no longer being broadcasted; and
in response to the detecting, automatically stopping the generating for display of the segment of the second program in the first portion of the display area.

10. The method of claim 1, further comprising:
determining that broadcasts for the second program and the third program are about to end;
prompting the user to select additional programs of interest;
receiving a user selection of additional programs of interest; and
generating for display the additional programs of interest.

11. A system for enhancing viewer experience, the system comprising:
control circuitry configured to:
tune to a first program with a first tuner;
generate for display the first program on a display area of a display device;
determine a second program of interest to a user and a third program of interest to a user;
tune, with a second tuner, to the second program and, simultaneously with the generating for display of the first program, generate for display a segment of the second program in a first portion of the display area on the display device;
tune, with the second tuner, to the third program and, simultaneously with the generating for display of the first program and the segment of the second program, generate for display a segment of the third program in a second portion of the display area on the display device; and
receive a user selection of a frequency at which to update the second and third programs of interest,
wherein the second tuner cycles between the second program and the third program based on the user selection of the frequency, while continuing to simultaneously generate for display the segment of the second program and the segment of the third program, to periodically update the segment of the second program in the first portion of the display area and the segment of the third program in the second portion of the display area.

12. The system of claim 11, wherein the control circuitry configured to generate for display the segment of the second program is further configured to:
select a subset of information from the second program, the subset of information including at least one of a video segment of the broadcast feed, a geographic portion of an image generated by the broadcast feed and a portion of metadata associated with the broadcast feed;
convert the subset of information into a new format;
generate the segment of the second program from the converted subset of information; and
generate for display the segment of the second program.

13. The system of claim 12, the control circuitry further configured to:
tune with a third tuner to a fourth program; and simultaneously with the generating for display the first, second and third programs, generate for display a segment of the fourth program in a third portion of the display area on the display device, wherein the second tuner and the third tuner cycle between the second, third and fourth programs to periodically update the segments of the second, third and fourth programs.

14. The system of claim 13, wherein the segment of the second program includes a plurality of images, and wherein the plurality of images is cropped before the segment of the second program is generated for display.

15. The system of claim 13, the control circuitry further configured to:
   crop the segment of the second program before generating for display the segment of the second program; and
   reformat the segment of the second program to change one of the resolution or file types of the segment of the second program.

16. The system of claim 13, the control circuitry further configured to:
   select a location and dimensions of the first portion of the display area on the display device, wherein the selecting is done by the user;
   determine bounds of the first selected portion of the display area based on the location and dimensions;
   crop the segment of the second program to match the bounds; and
   generate for display the segment of the second program in the selected first portion of the display area.

17. The system of claim 16, wherein the second and third programs of interest to the user are automatically determined based on user preferences.

18. The system of claim 11, the control circuitry further configured to:
   determine that broadcasts for the second program and the third program are about to end;
   prompt the user to select additional programs of interest;
   receive a user selection of additional programs of interest; and
   generate for display the additional programs of interest.

19. The system of claim 11, the control circuitry further configured to, further in response to the detecting, cause an additional amount of the display area to include the first program by automatically closing the first portion of the display device while maintaining the generating for display of the segment of the third program in the second portion of the display device.

20. The system of claim 11, wherein the control circuitry is further configured to:
   detect the second program is no longer being broadcasted; and
   automatically stop the generating for display of the segment of the second program in the first portion of the display area in response to the detecting the second program is no longer being broadcasted.

* * * * *